(12) United States Patent
Duke et al.

(10) Patent No.: US 12,196,981 B2
(45) Date of Patent: Jan. 14, 2025

(54) VARIABLE LENSES WITH IMPROVED IMAGE QUALITY DURING CONTINUOUS FOCUS, VIDEO RECORDING DEVICES, AND SYSTEMS AND METHODS COMPRISING THE SAME

(71) Applicant: CORNING INCORPORATED, Corning, NY (US)

(72) Inventors: John D Duke, Gilbert, AZ (US); Kee Siang Goh, Bayan Lepas (MY); Raymond Miller Karam, Santa Barbara, CA (US); Joseph Marshall Kunick, Swanzey, NH (US); Paul Michael Then, Victor, NY (US); Thomas Mikio Wynne, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 685 days.

(21) Appl. No.: 17/440,050

(22) PCT Filed: Mar. 12, 2020

(86) PCT No.: PCT/US2020/022231
§ 371 (c)(1),
(2) Date: Sep. 16, 2021

(87) PCT Pub. No.: WO2020/190601
PCT Pub. Date: Sep. 24, 2020

(65) Prior Publication Data
US 2022/0187508 A1 Jun. 16, 2022

Related U.S. Application Data

(60) Provisional application No. 62/819,861, filed on Mar. 18, 2019.

(51) Int. Cl.
*G02B 3/14* (2006.01)
*G02B 26/00* (2006.01)
*H04N 5/77* (2006.01)

(52) U.S. Cl.
CPC ............. *G02B 3/14* (2013.01); *G02B 26/005* (2013.01); *H04N 5/77* (2013.01)

(58) Field of Classification Search
CPC .... G02B 1/118; G02B 21/367; G02B 26/005; G02B 27/0075; G02B 3/14; G02B 7/365;
(Continued)

(56) References Cited

U.S. PATENT DOCUMENTS

2005/0199720 A1* 9/2005 Barkan ................... G02B 3/14
235/462.23
2020/0096678 A1 3/2020 Kaminski et al.
2020/0192080 A1 6/2020 Karam

FOREIGN PATENT DOCUMENTS

CN 101019129 A 8/2007
CN 109425918 A 3/2019
(Continued)

OTHER PUBLICATIONS

Fernandez et al., "Tests and evaluation of a variable focus liquid lens for curvature wavefront sensors in astronomy", Applied Optics, Optical Society of America, vol. 52, No. 30, 2013, pp. 7256-7264.
(Continued)

*Primary Examiner* — Brandi N Thomas
(74) *Attorney, Agent, or Firm* — Yiqun Zhao

(57) ABSTRACT

A liquid lens can include a cavity, a first liquid disposed within the cavity, and a second liquid disposed within the cavity. A focus of the liquid lens can be adjustable by adjusting a shape of a variable interface defined by the first liquid and the second liquid. Upon adjusting the focus of the liquid lens in a periodic oscillation with a peak-to-valley (Continued)

amplitude of 20 diopter and a frequency of 2 Hz, a root mean square (RMS) wavefront error (WFE) of the liquid lens measured at 1 ms intervals can remain at 100 nm or less throughout one complete cycle of the periodic oscillation.

12 Claims, 18 Drawing Sheets

(58) Field of Classification Search
CPC ........ G02B 26/004; G11B 2007/13727; G11B 7/1369; G11B 7/1378; G11B 7/0943; G11B 7/13925; G11B 2007/0006; G11B 2007/0013; G11B 7/08511; G11B 7/0908; G11B 7/0941; G11B 7/0948; G11B 7/131; G11B 7/1381; G11B 7/13927; G11B 7/28; G11B 7/0053; G11B 7/24079; A61B 3/1015; A61B 3/103; G03B 21/142; G03B 21/147; G03B 21/2046; G03B 21/208; G03B 21/53; G03B 21/606

See application file for complete search history.

(56) References Cited

FOREIGN PATENT DOCUMENTS

| CN | 110709732 A | 1/2020 |
|----|-------------|--------|
| WO | 2010/020901 A1 | 2/2010 |
| WO | 2010/073127 A2 | 7/2010 |

OTHER PUBLICATIONS

International Search Report and Written Opinion of the International Searching Authority; PCT/US2020/022231 dated Jun. 30, 2020; 12 pages; European Patent Office.

Oku et al., "High-speed liquid lens with 2-ms response and 80.3-nm root-mean-square wavefront error", SPIE-International Society For Optical Engineering, vol. 7594, 2010, 11 pages.

Chad Verzosa, "Sharp's Aquos R2 Smartphone Features a Dedicated Video Camera", Available at: "https://www.diyphotography.net/sharps-aquos-r2-smartphone-features-a-dedicated-video-camera/", May 9, 2018.

Chinese Patent Application No. 202080033459.5, Office Action, dated Jan. 19, 2023, 6 pages Chinese Patent Office.

\* cited by examiner

VARIABLE LENSES WITH IMPROVED IMAGE QUALITY DURING CONTINUOUS FOCUS, VIDEO RECORDING DEVICES, AND SYSTEMS AND METHODS COMPRISING THE SAME

CROSS-REFERENCE TO RELATED APPLICATIONS

This application claims the benefit of priority under 35 U.S.C. § 371 of International Application No. PCT/US2020/022231, filed on Mar. 12, 2020, which claims the benefit of priority under 35 U.S.C. § 119 of U.S. Provisional Application No. 62/819,861 filed Mar. 18, 2019, the content of each of which is incorporated herein by reference in its entirety.

BACKGROUND

1. Field

This disclosure relates to variable lenses, and more particularly, to variable lenses with improved image quality during continuous focus, as well as video recording devices, and systems and methods comprising such liquid lenses and/or video recording devices.

2. Technical Background

Liquid lenses generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

Disclosed herein are variable lenses, video recording devices, and systems and methods comprising such variable lenses and/or video recording devices.

Disclosed herein is a liquid lens comprising a cavity, a first liquid disposed within the cavity, and a second liquid disposed within the cavity. A focus of the liquid lens is adjustable by adjusting a shape of a variable interface defined by the first liquid and the second liquid. Upon adjusting the focus of the liquid lens in a periodic oscillation with a peak-to-valley amplitude of 20 diopter and a frequency of 2 Hz, a root mean square (RMS) wavefront error (WFE) of the liquid lens measured at 1 ms intervals remains at 100 nm or less throughout one complete cycle of the periodic oscillation.

Disclosed herein is a method of recording a video, the method comprising adjusting a focus of a liquid lens from a first focal length to a second focal length, and capturing image light passing through the liquid lens and incident on an image sensor during the adjusting the focus of the liquid lens at an image capture rate of at least 30 frames per second (fps) to record the video.

Disclosed herein is a video recording device comprising an image sensor, an optical system positioned to focus an image on the image sensor and comprising a variable focus lens, and a controller operable to adjust a focus of the variable focus lens during a focus period at a focus adjustment rate and repeatedly capture the image focused on the image sensor at an image capture rate of at least 30 frames per second (fps) during the focus period to record a video. A ratio of the focus adjustment rate to the image capture rate is 0.1 diopter/frame to 0.5 diopter/frame.

Disclosed herein is an electronic device comprising a video recording device and a camera module. The electronic device is operable to record a video using the video recording device and capture a still photograph using the camera module.

Disclosed herein is a liquid lens comprising a cavity, a first liquid disposed within the cavity, and a second liquid disposed within the cavity. A focus of the liquid lens is adjustable by adjusting a shape of a variable interface defined by the first liquid and the second liquid. Upon adjusting the focus of the liquid lens in a periodic oscillation with a peak-to-valley amplitude of 22 diopter and a frequency of 10 Hz, a root mean square (RMS) wavefront error (WFE) of the liquid lens measured at 1 ms intervals remains at 100 nm or less throughout one complete cycle of the periodic oscillation.

Disclosed herein is a liquid lens comprising a cavity, a first liquid disposed within the cavity, and a second liquid disposed within the cavity. A focus of the liquid lens is adjustable by adjusting a shape of a variable interface defined by the first liquid and the second liquid. Upon adjusting the focus of the liquid lens in a periodic oscillation with a peak-to-valley amplitude of 69 diopter and a frequency of 2 Hz, a RMS WFE of the liquid lens measured at 1 ms intervals remains at 300 nm or less throughout one complete cycle of the periodic oscillation.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
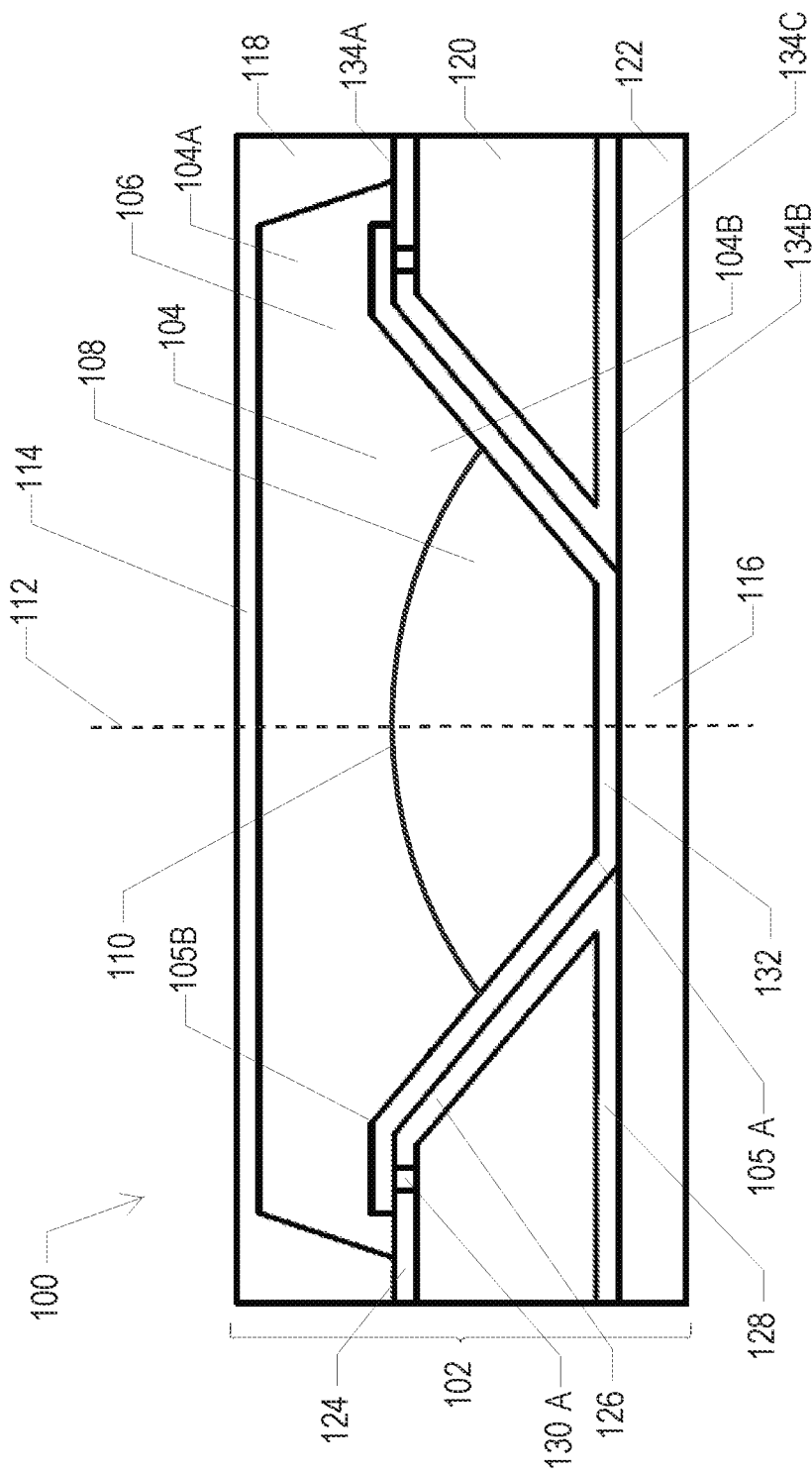
FIG. 1 is a schematic cross-sectional view of some embodiments of a liquid lens.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

In various embodiments, a liquid lens comprises a cavity, a first liquid disposed within the cavity, and a second liquid disposed within the cavity. In some of such embodiments, a focus of the liquid lens is adjustable by adjusting a shape of a variable interface defined by the first liquid and the second liquid. Additionally, or alternatively, upon adjusting the focus of the liquid lens in a periodic oscillation with a peak-to-valley (PV) amplitude of 20 diopter and a frequency of 2 Hz, or a higher frequency of 10 Hz, a root mean square (RMS) wavefront error (WFE) of the liquid lens measured at 1 ms intervals remains at 100 nm or less throughout one complete cycle of the periodic oscillation.

In various embodiments, a method of recording a video comprises adjusting a focus of a liquid lens from a first focal length to a second focal length and capturing image light passing through the liquid lens and incident on an image sensor during the adjusting the focus of the liquid lens at an image capture rate of at least 30 frames per second (fps) to record the video. In some of such embodiments, a video recording device comprising the liquid lens and the image sensor comprises a spatial frequency response (SFR) of at least 35% up to a maximum field over a focus range of the liquid lens, measured at a 1/4 Nyquist frequency according to ISO 12233:2017, wherein the focus range is 0 diopter to 30 diopter, and the maximum field is 50 degrees. Additionally, or alternatively, the adjusting the focus of the liquid lens comprises adjusting the focus of the liquid lens at a focus adjustment rate, and a ratio of the focus adjustment rate to the image capture rate is 0.1 diopter/frame to 0.5 diopter/frame.

In various embodiments, a video recording device comprises an image sensor and an optical system positioned to focus an image on the image sensor and comprising a variable focus lens. In some of such embodiments, a controller is operable to adjust a focus of the variable focus lens during a focus period at a focus adjustment rate and repeatedly capture the image focused on the image sensor at an image capture rate of at least 30 frames per second (fps) during the focus period to record a video. In some embodiments, a ratio of the focus adjustment rate to the image capture rate is 0.1 diopter/frame to 0.5 diopter/frame. Such a focus transition can enable sufficiently fast autofocus without image blur that could be caused by higher speed transition (e.g., at rates above 0.5 diopter/frame, such as 0.75 diopter/frame or 1 diopter/frame).

In some embodiments, the liquid lens described herein is capable of maintaining a relatively low RMS WFE while the focus of the liquid lens is in transition from a first focal length to a second focal length. For example, the relatively low RMS WFE can be enabled by the relatively uniform (e.g., smooth) shape of the variable interface defined between the first liquid and the second liquid during the transition and/or the speed of the variable interface through the transition (e.g., the response time of the liquid lens). In some embodiments, a plurality of images formed by passing image light though the liquid lens can be successively captured at a high frame rate to record a video (e.g., a high speed video) as described herein. For example, the frame rate can be sufficiently high that the images are captured while the focus of the liquid lens is transitioning as opposed to waiting for the liquid lens to settle (e.g., at a particular focal length) before capturing the images. In some embodiments, such a video can have a suitable image quality as reflected by the SFR of the optical system (e.g., as a result of the relatively low RMS WFE of the liquid lens during the transition). Thus, the liquid lens described herein can enable recording video (e.g., high speed video) during continuous focus.

FIG. 1 is a schematic cross-sectional view of some embodiments of a liquid lens 100. In some embodiments, liquid lens 100 comprises a lens body 102 and a cavity 104 formed in the lens body. A first liquid 106 and a second liquid 108 are disposed within cavity 104. In some embodiments, first liquid 106 is a polar liquid or a conducting liquid. Additionally, or alternatively, second liquid 108 is a non-polar liquid or an insulating liquid. In some embodiments, first liquid 106 and second liquid 108 have different refractive indices such that an interface 110 between the first liquid and the second liquid forms a lens. In some embodiments, first liquid 106 and second liquid 108 have substantially the same density, which can help to avoid changes in the shape of interface 110 as a result of changing the physical orientation of liquid lens 100 (e.g., as a result of gravitational forces).

In some embodiments, first liquid 106 and second liquid 108 are in direct contact with each other at interface 110. For example, first liquid 106 and second liquid 108 are substantially immiscible with each other such that the contact surface between the first liquid and the second liquid defines interface 110. In some embodiments, first liquid 106 and second liquid 108 are separated from each other at interface 110. For example, first liquid 106 and second liquid 108 are separated from each other by a membrane (e.g., a polymeric membrane) that defines interface 110.

In some embodiments, cavity 104 comprises a first portion, or headspace, 104A and a second portion, or base portion, 104B. For example, second portion 104B of cavity 104 is defined by a bore in an intermediate layer of liquid lens 100 as described herein. Additionally, or alternatively, first portion 104A of cavity 104 is defined by a recess in a first outer layer of liquid lens 100 and/or disposed outside of the bore in the intermediate layer as described herein. In some embodiments, at least a portion of first liquid 106 is disposed in first portion 104A of cavity 104. Additionally, or alternatively, second liquid 108 is disposed within second portion 104B of cavity 104. For example, substantially all or a portion of second liquid 108 is disposed within second portion 104B of cavity 104. In some embodiments, the perimeter of interface 110 (e.g., the edge of the interface in contact with the sidewall of the cavity) is disposed within second portion 104B of cavity 104.

Interface 110 can be adjusted via electrowetting. For example, a voltage can be applied between first liquid 106 and a surface of cavity 104 (e.g., an electrode positioned near the surface of the cavity and insulated from the first liquid as described herein) to increase or decrease the wettability of the surface of the cavity with respect to the first liquid and change the shape of interface 110. In some embodiments, adjusting interface 110 changes the shape of the interface, which changes the focal length or focus of liquid lens 100. For example, such a change of focal length can enable liquid lens 100 to perform an autofocus function. Additionally, or alternatively, adjusting interface 110 tilts the interface relative to an optical axis 112 of liquid lens 100. For example, such tilting can enable liquid lens 100 to perform an optical image stabilization (OIS) function. Adjusting interface 110 can be achieved without physical movement of liquid lens 100 relative to an image sensor, a fixed lens or lens stack, a housing, or other components of a camera module in which the liquid lens can be incorporated.

In some embodiments, lens body 102 of liquid lens 100 comprises a first window 114 and a second window 116. In some of such embodiments, cavity 104 is disposed between first window 114 and second window 116. In some embodiments, lens body 102 comprises a plurality of layers that cooperatively form the lens body. For example, in the embodiments shown in FIG. 1, lens body 102 comprises a first outer layer 118, an intermediate layer 120, and a second outer layer 122. In some of such embodiments, intermediate layer 120 comprises a bore formed therethrough. First outer layer 118 can be bonded to one side (e.g., the object side) of intermediate layer 120. For example, first outer layer 118 is bonded to intermediate layer 120 at a bond 134A. Bond 134A can be an adhesive bond, a laser bond (e.g., a laser weld), or another suitable bond capable of maintaining first liquid 106 and second liquid 108 within cavity 104. Additionally, or alternatively, second outer layer 122 can be bonded to the other side (e.g., the image side) of intermediate layer 120 (e.g., opposite first outer layer 118). For example, second outer layer 122 is bonded to intermediate layer 120 at a bond 134B and/or a bond 134C, each of which can be configured as described herein with respect to bond 134A. In some embodiments, intermediate layer 120 is disposed between first outer layer 118 and second outer layer 122, the bore in the intermediate layer is covered on opposing sides by the first outer layer and the second outer layer, and at least a portion of cavity 104 is defined within the bore. Thus, a portion of first outer layer 118 covering cavity 104 serves as first window 114, and a portion of second outer layer 122 covering the cavity serves as second window 116.

In some embodiments, cavity 104 comprises first portion 104A and second portion 104B. For example, in the embodiments shown in FIG. 1, second portion 104B of cavity 104 is defined by the bore in intermediate layer 120, and first portion 104A of the cavity is disposed between the second portion of the cavity and first window 114. In some embodiments, first outer layer 118 comprises a recess as shown in FIG. 1, and first portion 104A of cavity 104 is disposed within the recess in the first outer layer. Thus, first portion 104A of cavity 104 is disposed outside of the bore in intermediate layer 120.

In some embodiments, cavity 104 (e.g., second portion 104B of the cavity) is tapered as shown in FIG. 1 such that a cross-sectional area of the cavity decreases along optical axis 112 in a direction from the object side to the image side. For example, second portion 104B of cavity 104 comprises a narrow end 105A and a wide end 105B. The terms "narrow" and "wide" are relative terms, meaning the narrow end is narrower, or has a smaller width or diameter, than the wide end. Such a tapered cavity can help to maintain alignment of interface 110 between first liquid 106 and second liquid 108 along optical axis 112. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light enters liquid lens 100 through first window 114, is refracted at interface 110 between first liquid 106 and second liquid 108, and exits the liquid lens through second window 116. In some embodiments, first outer layer 118 and/or second outer layer 122 comprise a sufficient transparency to enable passage of the image light. For example, first outer layer 118 and/or second outer layer 122 comprise a polymeric, glass, ceramic, or glass-ceramic material. In some embodiments, outer surfaces of first outer layer 118 and/or second outer layer 122 are substantially planar. Thus, even though liquid lens 100 can function as a lens (e.g., by refracting image light passing through interface 110), outer surfaces of the liquid lens can be flat as opposed to being curved like the outer surfaces of a fixed lens. Such planar outer surfaces can make integrating liquid lens 100 into an optical assembly (e.g., a lens stack) less difficult. In other embodiments, outer surfaces of the first outer layer and/or the second outer layer are curved (e.g., concave or convex). Thus, the liquid lens can comprise an integrated fixed lens. In some embodiments, intermediate layer 120 comprises a metallic, polymeric, glass, ceramic, or glass-ceramic material. Because image light can pass through the bore in intermediate layer 120, the intermediate layer may or may not be transparent.

Although lens body 102 of liquid lens 100 is described as comprising first outer layer 118, intermediate layer 120, and second outer layer 122, other embodiments are included in this disclosure. For example, in some other embodiments, one or more of the layers is omitted. For example, the bore in the intermediate layer can be configured as a blind hole that does not extend entirely through the intermediate layer, and the second outer layer can be omitted. Although first portion 104A of cavity 104 is described herein as being disposed within the recess in first outer layer 118, other embodiments are included in this disclosure. For example, in some other embodiments, the recess is omitted, and the first portion of the cavity is disposed within the bore in the intermediate layer. Thus, the first portion of the cavity is an upper portion of the bore, and the second portion of the cavity is a lower portion of the bore. In some other embodiments, the first portion of the cavity is disposed partially within the bore in the intermediate layer and partially outside the bore.

In some embodiments, liquid lens 100 comprises a common electrode 124 in electrical communication with first liquid 106. Additionally, or alternatively, liquid lens 100 comprises a driving electrode 126 disposed on a sidewall of cavity 104 and insulated from first liquid 106 and second liquid 108. Different voltages can be supplied to common electrode 124 and driving electrode 126 to change the shape of interface 110 as described herein.

In some embodiments, liquid lens 100 comprises a conductive layer 128 at least a portion of which is disposed within cavity 104. For example, conductive layer 128 comprises a conductive coating applied to intermediate layer 120 prior to bonding first outer layer 118 and/or second outer layer 122 to the intermediate layer. Conductive layer 128 can comprise a metallic material, a conductive polymer material, another suitable conductive material, or a combination thereof. Additionally, or alternatively, conductive layer 128 can comprise a single layer or a plurality of layers, some or all of which can be conductive. In some embodiments, conductive layer 128 defines common electrode 124 and/or driving electrode 126. For example, conductive layer 128 can be applied to substantially the entire outer surface of intermediate layer 118 prior to bonding first outer layer 118 and/or second outer layer 122 to the intermediate layer. Following application of conductive layer 128 to intermediate layer 118, the conductive layer can be segmented into various conductive elements (e.g., common electrode 124, driving electrode 126, and/or other electrical devices). In some embodiments, liquid lens 100 comprises a scribe 130A in conductive layer 128 to isolate (e.g., electrically isolate) common electrode 124 and driving electrode 126 from each other. In some embodiments, scribe 130A comprises a gap in conductive layer 128. For example, scribe 130A is a gap with a width of about 5 μm, about 10 μm, about 15 μm, about 20 μm, about 25 μm, about 30 μm, about 35 μm, about 40 μm, about 45 μm, about 50 μm, or any ranges defined by the listed values.

In some embodiments, liquid lens 100 comprises an insulating layer 132 disposed within cavity 104. For example, insulating layer 132 comprises an insulating coating applied to intermediate layer 120 prior to bonding first outer layer 118 and/or second outer layer 122 to the intermediate layer. In some embodiments, insulating layer 132 comprises an insulating coating applied to conductive layer 128 and second window 116 after bonding second outer layer 122 to intermediate layer 120 and prior to bonding first outer layer 118 to the intermediate layer. Thus, insulating layer 132 covers at least a portion of conductive layer 128 within cavity 104 (e.g., driving electrode 126) and second window 116. In some embodiments, insulating layer 132 can be sufficiently transparent to enable passage of image light through second window 116 as described herein. Insulating layer 132 can comprise polytetrafluoroethylene (PTFE), parylene, another suitable polymeric or non-polymeric insulating material, or a combination thereof. Additionally, or alternatively, insulating layer 132 comprises a hydrophobic material. Additionally, or alternatively, insulating layer 132 can comprise a single layer or a plurality of layers, some or all of which can be insulating.

In some embodiments, insulating layer 132 covers at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 is uncovered by insulating layer 132. Thus, common electrode 124 can be in electrical communication with first liquid 106 as described herein. In some embodiments, insulating layer 132 comprises a hydrophobic surface layer of second portion 104B of cavity 104. Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein.

Figure 2:
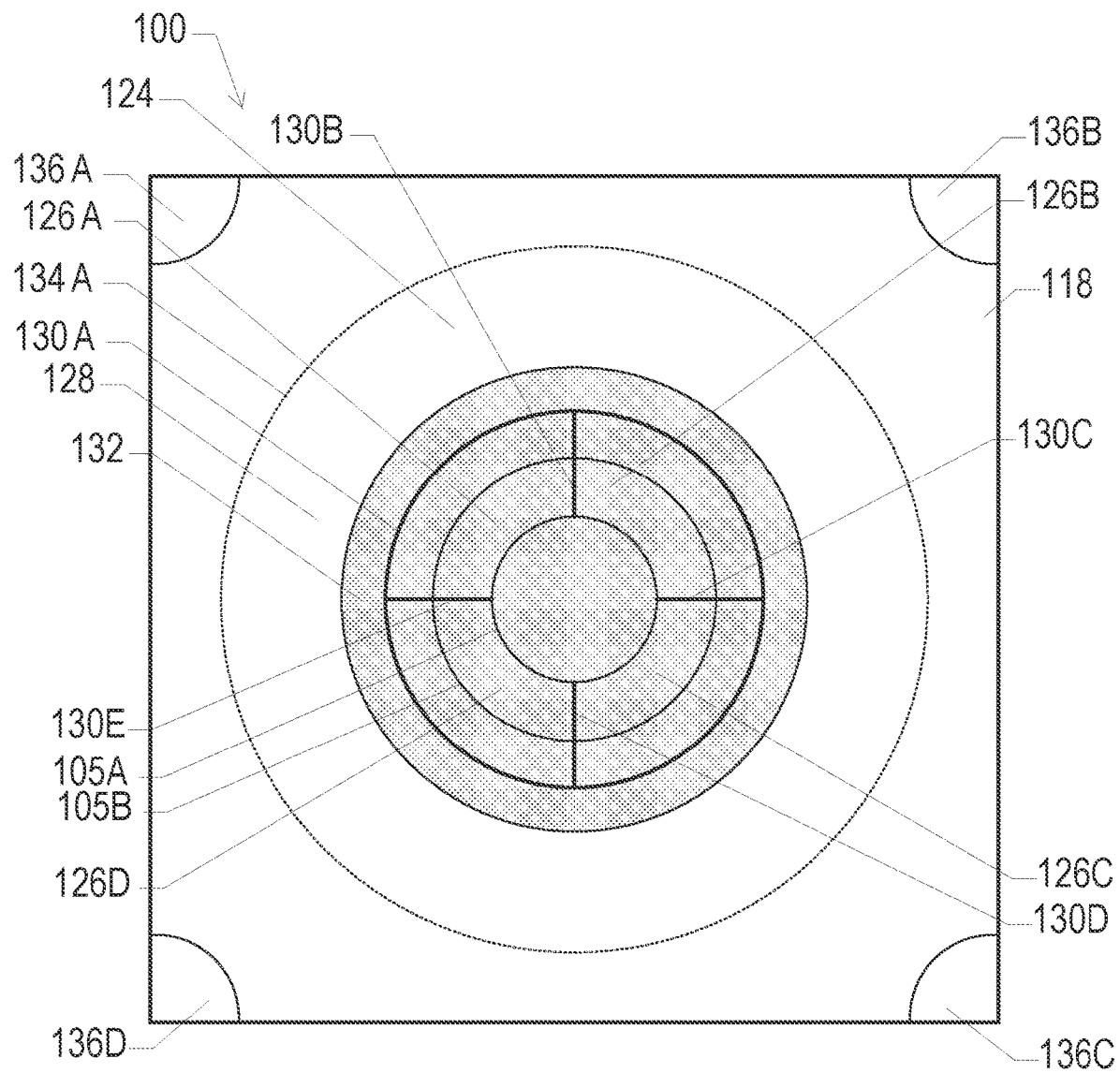
FIG. 2 is a schematic front view of some embodiments of the liquid lens shown in FIG. 1 looking through a first outer layer of the liquid lens.
Figure 3:
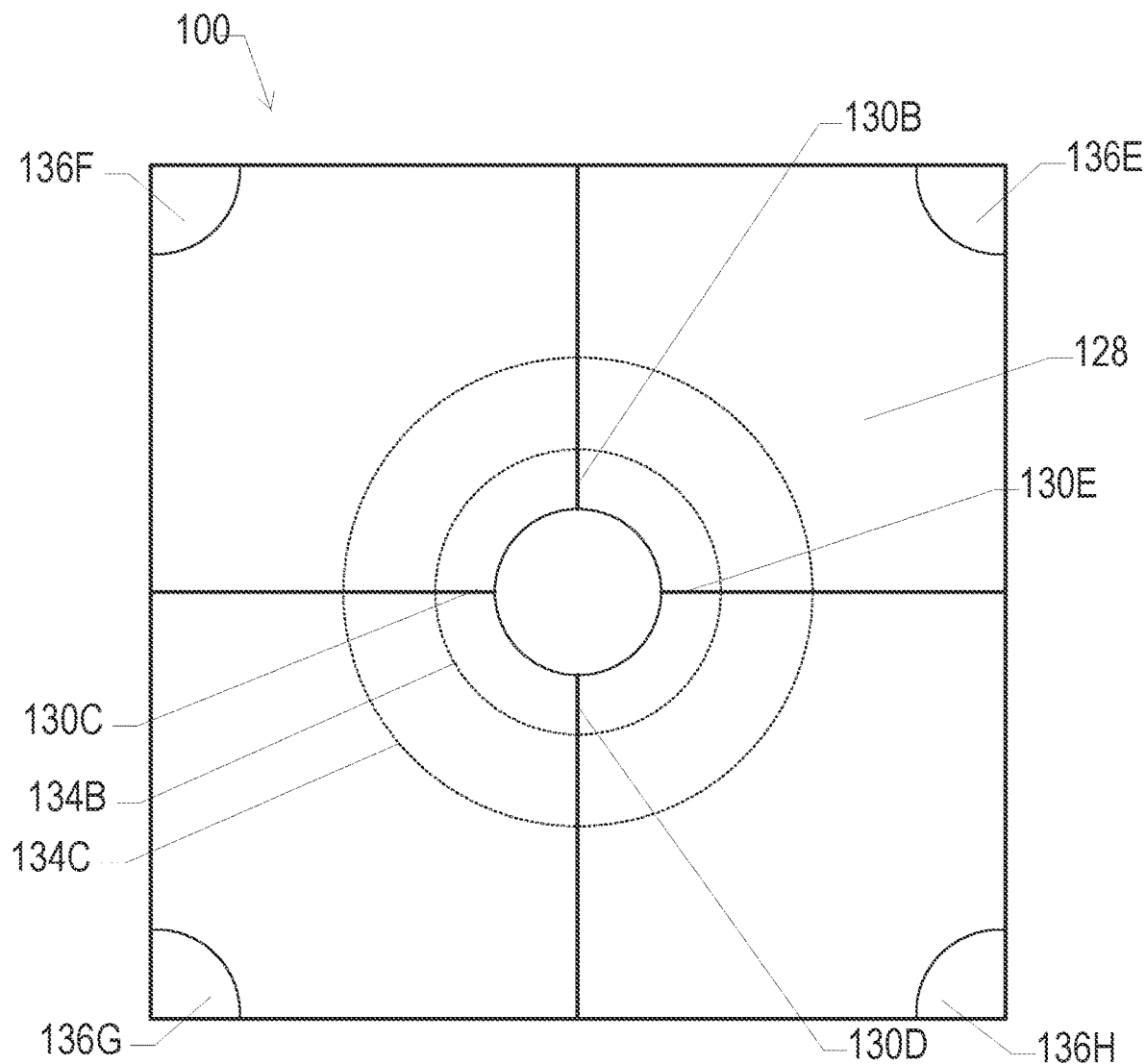
FIG. 3 is a schematic rear view of some embodiments of the liquid lens shown in FIG. 1 looking through a second outer layer of the liquid lens.

FIG. 2 is a schematic front view of liquid lens 100 looking through first outer layer 118, and FIG. 3 is a schematic rear view of the liquid lens looking through second outer layer 122. For clarity in FIGS. 2 and 3, and with some exceptions, bonds generally are shown in dashed lines, scribes generally are shown in heavier lines, and other features generally are shown in lighter lines.

In some embodiments, common electrode 124 is defined between scribe 130A and bond 134A, and a portion of the common electrode is uncovered by insulating layer 132 such that the common electrode can be in electrical communication with first liquid 106 as described herein. In some embodiments, bond 134A is configured such that electrical continuity is maintained between the portion of conductive layer 128 inside the bond (e.g., inside cavity 104) and the portion of the conductive layer outside the bond (e.g., inside the cavity). In some embodiments, liquid lens 100 comprises one or more cutouts 136 in first outer layer 118. For example, in the embodiments shown in FIG. 2, liquid lens 100 comprises a first cutout 136A, a second cutout 136B, a third cutout 136C, and a fourth cutout 136D. In some embodiments, cutouts 136 comprise portions of liquid lens 100 at which first outer layer 118 is removed to expose conductive layer 128. Thus, cutouts 136 can enable electrical connection to common electrode 124, and the regions of conductive layer 128 exposed at the cutouts can serve as contacts to enable electrical connection of liquid lens 100 to a controller, a driver, or another component of a lens or camera system.

Although cutouts 136 are described herein as being positioned at corners of liquid lens 100, other embodiments are included in this disclosure. For example, in some embodiments, one or more of the cutouts are disposed inboard of the outer perimeter of the liquid lens and/or along one or more edges of the liquid lens.

In some embodiments, driving electrode 126 comprises a plurality of driving electrode segments. For example, in the embodiments shown in FIGS. 2 and 3, driving electrode 126 comprises a first driving electrode segment 126A, a second driving electrode segment 126B, a third driving electrode segment 126C, and a fourth driving electrode segment 126D. In some embodiments, the driving electrode segments are distributed substantially uniformly about the sidewall of cavity 104. For example, each driving electrode segment occupies about one quarter, or one quadrant, of the sidewall of second portion 104B of cavity 104. In some embodiments, adjacent driving electrode segments are isolated from each other by a scribe. For example, first driving electrode segment 126A and second driving electrode segment 126B are isolated from each other by a scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of liquid lens 100 as shown in FIG. 3. Such a configuration can ensure electrical isolation of the adjacent driving electrode segments from each other. Additionally, or alternatively, such a configuration can enable each driving electrode segment to have a corresponding contact for electrical connection as described herein.

Although driving electrode 126 is described herein as being divided into four driving electrode segments, other embodiments are included in this disclosure. In some other embodiments, the driving electrode comprises a single driving electrode (e.g., substantially circumscribing the sidewall of the cavity). For example, the liquid lens comprising the such a single driving electrode can be capable of varying focal length, but incapable of tilting the interface (e.g., an autofocus only liquid lens). In some other embodiments, the driving electrode is divided into two, three, five, six, seven, eight, or more driving electrode segments (e.g., distributed substantially uniformly about the sidewall of the cavity).

In some embodiments, bond 134B and/or bond 134C are configured such that electrical continuity is maintained between the portion of conductive layer 128 inside the respective bond and the portion of the conductive layer outside the respective bond. In some embodiments, liquid lens 100 comprises one or more cutouts 136 in second outer layer 122. For example, in the embodiments shown in FIG. 3, liquid lens 100 comprises a fifth cutout 136E, a sixth cutout 136F, a seventh cutout 136G, and an eighth cutout 136H. In some embodiments, cutouts 136 comprise portions of liquid lens 100 at which second outer layer 122 is removed to expose conductive layer 128. Thus, cutouts 136 can enable electrical connection to driving electrode 126, and the regions of conductive layer 128 exposed at cutouts 136 can serve as contacts to enable electrical connection of liquid lens 100 to a controller, a driver, or another component of a lens or camera system.

Different driving voltages can be supplied to different driving electrode segments to tilt the interface of the liquid lens (e.g., for OIS functionality). Additionally, or alternatively, a driving voltage can be supplied to a single driving electrode or the same driving voltage can be supplied to each driving electrode segment to maintain the interface of the liquid lens in a substantially spherical orientation about the optical axis (e.g., for autofocus functionality).

In some embodiments, liquid lens 100 has a sufficiently fast response time when the focus of the liquid lens is adjusted and/or maintains a sufficiently smooth or uniform interface 110 during the transition of the focus to enable the liquid lens to sweep continuously through a range of focal lengths while maintaining a relatively low RMS WFE, which can enable recording of high speed video during the focus adjustment as described herein.

For example, when interface 110 of liquid lens 100 is adjusted (e.g., to change the focal length of the liquid lens), first liquid 106 and second liquid 108 take time to move into their adjusted positions. The shifting of first liquid 106 and second liquid 108 can take time, for example, due to the fluid dynamics of the liquids moving relative to each other and/or relative to the boundaries of cavity 104. The configuration and operation of liquid lens 100 can enable the fast response time and/or low RMS WFE described herein. For example, the structure of liquid lens 100, the properties of first liquid 106 and second liquid 108, and the driving signals used to adjust interface 110 can enable the fast response time and/or low RMS WFE described herein.

In some embodiments, increasing the height of liquid lens 100 can improve (e.g., reduce) response time. For example, increasing the distance between interface 110 and first window 114 (e.g., an inner surface of the first window) and/or increasing the distance between the interface and second window 116 (e.g., an inner surface of the second window) can decrease the response time. Although this disclosure is not to be limited by theory, it is believed a configuration of liquid lens 100 in which more liquid movement occurs away from the boundary layer of first liquid 106 and/or second liquid 108 (e.g., at first window 114 and/or second window 116, respectively) can help to enable the liquid near interface 110 to move more freely. However, increasing the distance between interface 110 and first window 114 and/or second window 116 can have diminishing returns. Additionally, or alternatively, it can be advantageous to reduce the height of cavity 104 (e.g., to reduce the amount of first liquid 106 and/or second liquid 108 in liquid lens 100) and/or to reduce the distance between interface 110 and first window 114 and/or second windows 116 (e.g., to increase damping as the interface moves). Accordingly, a balance between competing factors can be used to determine the appropriate height of cavity 104 (e.g., distance between first window 114 and second window 116) and volumes of first liquid 106 and second liquid 108 in liquid lens 100.

In some embodiments, reducing the width or diameter of interface 110 can improve response time. For example, reducing the diameter of liquid lens 100 (e.g., the diameter of narrow end 105A and/or wide end 105B of cavity 104) can reduce the response time. Additionally, or alternatively, reducing the angle between the sidewall of cavity 104 and optical axis 112 can reduce the response time. Although this disclosure is not to be limited by theory, it is believed that reducing the amount (e.g., volume) of first liquid 106 and/or second liquid 108 that is moved within liquid lens 100 can help to enable interface 110 to move more quickly.

In some embodiments, liquid lens 100 can introduce optical aberrations to light (e.g., image light) that is transmitted through the liquid lens. For example, interface 110 can have a shape that is not optically ideal, which can introduce optical aberrations (e.g., coma, trefoil, astigmatism, etc.). In some embodiments, liquid lens 100 can be configured to reduce optical aberrations or to otherwise improve the optical performance of the liquid lens.

In some embodiments, increasing the size of interface 110 can reduce optical aberrations. For example, widening cavity 104 relative to narrow end 105A (e.g., widening the truncated cone that forms the sidewalls of the cavity by increasing the cone angle) can reduce some optical aberrations. Although this disclosure is not to be limited by theory, it is believed that the strongest optical aberrations (e.g., for trefoil) occur at the edges of interface 110 (e.g., where the interface contacts the sidewall of cavity 104). By moving the edges of interface 110 farther outside the area of liquid lens 110 that transmits light that reaches the image sensor (e.g., outside the optical aperture), the optical aberrations can be reduced for the light that reaches the image sensor to produce the image. For example, increasing the size of narrow end 105A of cavity 104 while keeping the cone angle and the clear aperture the same can reduce some optical aberrations.

In some embodiments, some types of WFE can increase while other types of WFE decrease, and vice versa. For example, reducing the cone angle (e.g., to steepen the sidewalls of cavity 104) can increase trefoil, while reducing coma. Accordingly, a balance between competing factors can be used to determine the parameters for liquid lens 100.

In some embodiments, the shape of cavity 104 can be configured to balance or prioritize the operational parameters of liquid lens 100 (e.g., to enable operation of the liquid lens for recording high speed video as described herein). For example, the angle of the sidewall of cavity 104 relative to optical axis 112 can be about 5 degrees, about 10 degrees, about 20 degrees, about 25 degrees, about 30 degrees, about 35 degrees, about 40 degrees, about 45 degrees, about 50 degrees, about 60 degrees, about 70 degrees, about 80 degrees, about 85 degrees, or any angle therebetween, or any range bounded by any combination of these values, although other angles outside these ranges can be used in some instances.

In some embodiments, liquid lens 100 can be configured such that the shear force on first liquid 106 and the shear force on second liquid 108 can be substantially balanced during transition of interface 110 (e.g., during adjustment of the focus of the liquid lens). For example, the shear forces on first liquid 106 and second liquid 108 can vary by no more than about 1%, about 2%, about 3%, about 5%, about 7%, about 10%, about 15%, about 20%, about 25%, about 30%, or any values therebetween, or any ranges bounded by any combination of these values, although other values could be used. For example, when interface 110 is moved, a portion of first liquid 106 and a portion of second liquid 108 can move within cavity 104, while a portion of first liquid 106 and a portion of second liquid 108 adjacent to stationary structures in liquid lens 100 (e.g., first window 114 and/or second window 116) can act as boundary layers for the first liquid and the second liquid, which can resist movement. In some embodiments, the shear forces can extend to and affect the movement of first liquid 106 and second liquid 108 at interface 110, which can slow down the response time of liquid lens 100. Additionally, or alternatively, the shear forces can increase damping in liquid lens 100. The degree to which the shear forces can affect movement of interface 110 can depend, for example, on the viscosity of first liquid 106 and second liquid 108, the area of interface 110 with the stationary structure, and/or the distance from the boundary layer to the interface. In some embodiments, first liquid 106 can have a viscosity of 1 to 2 mPa*s (at 20 degrees Celsius) and/or second liquid 108 can have a viscosity of 2 to 5 mPa*s (at 20 degrees Celsius). Because second liquid 108 can be more viscous than first liquid 106, shear forces can have a greater effect farther from the boundary layer in the second liquid than in the first liquid. Accordingly, the height of second liquid 108 can be increased as the viscosity of the second liquid increases relative to the viscosity of first liquid 106 to balance the shear forces (e.g., at interface 110). In some embodiments, a larger boundary layer area (e.g., more area of contact between a liquid and a stationary structure) can increase the shear force. Accordingly, relative heights of first liquid 106 and second liquid 108 within cavity 104 can be adjusted to account for the boundary layer areas in the liquids. In some embodiments, a ratio of the height of first liquid 106 to the height of second liquid 108 can be about 10 to 1, about 7 to 1, about 5 to 1, about 3 to 1, about 2 to 1, about 1.5 to 1, about 1 to 1, about 0.75 to 1, about 0.5 to 1, about 0.25 to 1, about 0.1 to 1, or any values therebetween, or any ranges of ratios bounded by any combination of these values, although values outside these ranges can be used in some instances. In some embodiments, the height of second liquid 108 can be larger than the height of first liquid 106 (or vice versa), such as by 0% (same size), about 5%, about 10%, about 20%, about 30%, about 40%, about 50%, about 75%, about 100%, about 150%, about 200%, about 300%, or any values therebetween, or any ranges of values bounded by any combination of these values, although other values could be used.

In some embodiments, a ratio of a width or diameter of narrow end 105A of cavity 104 to the height of first liquid 106 and/or the height of second liquid 108 can be about 25 to 1, about 20 to 1, about 15 to 1, about 12 to 1, about 10 to 1, about 8 to 1, about 6 to 1, about 5 to 1, about 4 to 1, about 3 to 1, about 2 to 1, about 1.5 to 1, about 1.25 to 1, about 1 to 1, about 0.9 to 1, about 0.8 to 1, about 0.75 to 1, or any ratio values therebetween, or any range of values bounded by any combination of these ratio values, although other values outside these ranges could be used in some implementations. The heights of the liquids as described herein can refer to the heights of the liquids when liquid lens is at a focus of zero diopter (e.g., when the interface is flat). The total height of cavity 104 can be the sum of any of the values disclosed for the height of first liquid 106 and the height of second liquid 108. In some embodiments, the width or diameter of narrow end 105A of cavity 104 can be larger than the height of first liquid 106 and/or the height of second liquid 108 by 0% (same size), about 5%, about 10%, about 20%, about 30%, about 40%, about 50%, about 75%, about 100%, about 150%, about 200%, about 300%, about 350%, about 400%, about 450%, about 500%, about 600%, about 700%, about 800%, about 900%, about 1,000%, or any values therebetween, or any ranges of values bounded by any combination of these values, although other values could be used. In some embodiments, the height of first liquid 106 and/or the height of second liquid 108 can be larger than the width or diameter of narrow end 105A of cavity 104 by 0% (same size), about 5%, about 10%, about 20%, about 30%, about 40%, about 50%, about 75%, about 100%, about 150%, about 200%, about 300%, about 400%, about 500%, or any values therebetween, or any ranges of values bounded by any combination of these values, although other values could be used.

Figure 4:
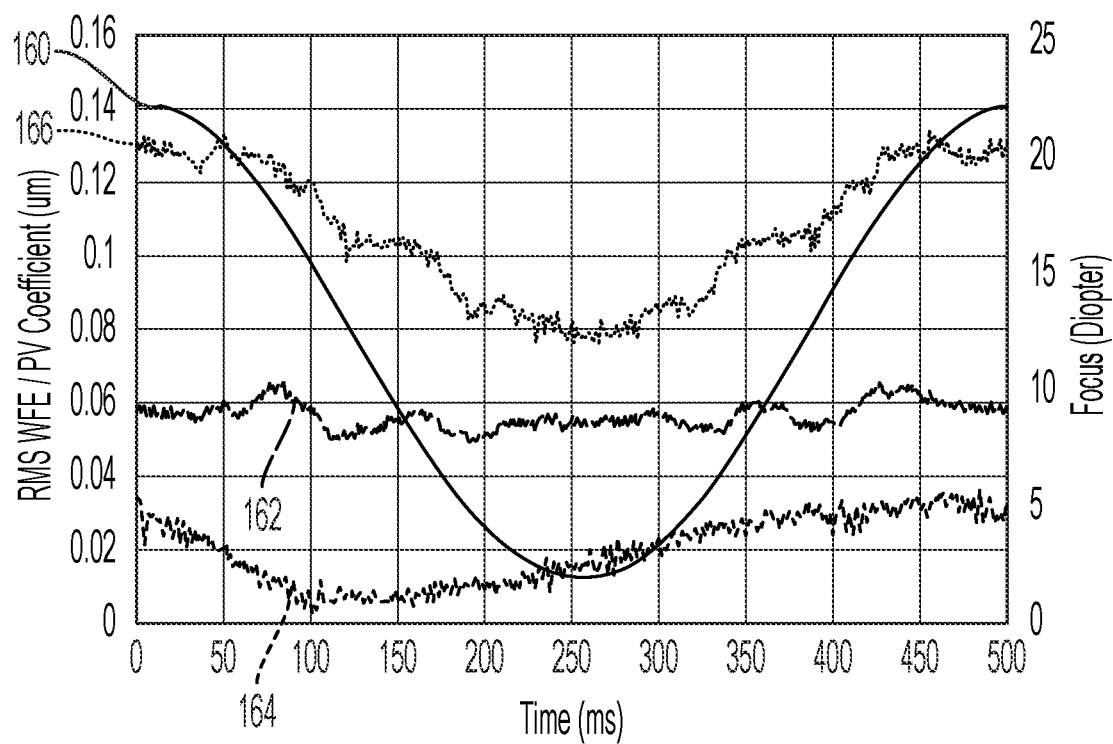
FIG. 4 is a plot representing the image quality of some embodiments of a liquid lens as the focus of the liquid lens sweeps through a range of focal lengths.

In some embodiments, liquid lens 100 is configured (e.g., using the parameters described herein) to have a sufficiently fast response time when the focus of the liquid lens is adjusted and/or to maintain a sufficiently smooth or uniform interface 110 during the transition of the focus to enable the liquid lens to sweep continuously through a range of focal lengths while maintaining a relatively low RMS WFE, which can enable recording of video (e.g., high speed video) during the focus adjustment as described herein. FIG. 4 is a plot representing the image quality of some embodiments of liquid lens 100 as the focus of the liquid lens sweeps through a range of focal lengths. The X-axis shows time in ms. The Y-axis on the left side of the plot shows RMS WFE or peak-to-valley (PV) Zernike coefficients, both in μm. The Y-axis on the right side of the plot shows the focal length (e.g., lens power) of the liquid lens in diopter. The liquid lens used to generate the plot shown in FIG. 4 was configured generally as shown in FIG. 1 and had a 3.6 mm diameter and 55 μm thick first window 114, a 482 μm thick intermediate layer 120, a 1.85 mm diameter narrow end 105A of cavity 104, a 30 degree angle between the cavity sidewall and optical axis 112, and a 255 μm distance between second window 116 and interface 110 at zero diopter (e.g., height of second liquid 108).

To generate the plot shown in FIG. 4, the focus of the liquid lens was adjusted in a periodic oscillation with a PV amplitude of 20 diopter and a frequency of 2 Hz, resulting in the changing focal length over time represented by a focus curve 160 having a peak at 22 diopter and a valley at 2 diopter. A WFE curve 162 shows the RMS WFE of the liquid lens, measured at 1 ms intervals during the focus adjustment (e.g., the focus oscillation). As shown in FIG. 4, the RMS WFE of the liquid lens remained at 70 nm or less throughout the one complete cycle of the periodic oscillation. A spherical aberration curve 164 shows the absolute value of the PV spherical Zernike coefficient ($Z_4^0$) (e.g., the determined coefficient multiplied by −1), measured at 1 ms intervals during the focus adjustment (e.g., the focus oscillation). As shown in FIG. 4, the PV spherical Zernike coefficient remained below 40 nm throughout the one complete cycle of the periodic oscillation. A quadrafoil aberration curve 166 represents the PV vertical quadrafoil Zernike coefficient ($Z_4^4$), measured at 1 ms intervals during the focus adjustment (e.g., the focus oscillation). As shown in FIG. 4, the PV vertical quadrafoil Zernike coefficient remained below 140 nm throughout the one complete cycle of the periodic oscillation.

In some embodiments, upon adjusting the focus of liquid lens 100 in the periodic oscillation with the PV amplitude of 20 diopter and the frequency of 2 Hz, the RMS WFE of the liquid lens measured at 1 ms intervals remains at 100 nm or less, 90 nm or less, 80 nm or less, or 70 nm or less throughout the one complete cycle of the periodic oscillation. Additionally, or alternatively, the PV spherical Zernike coefficient of liquid lens 100 remains below 40 nm throughout the one complete cycle of the periodic oscillation. Additionally, or alternatively, the PV vertical quadrafoil Zernike coefficient of liquid lens 100 remains below 140 nm throughout the one complete cycle of the periodic oscillation.

Figure 5:
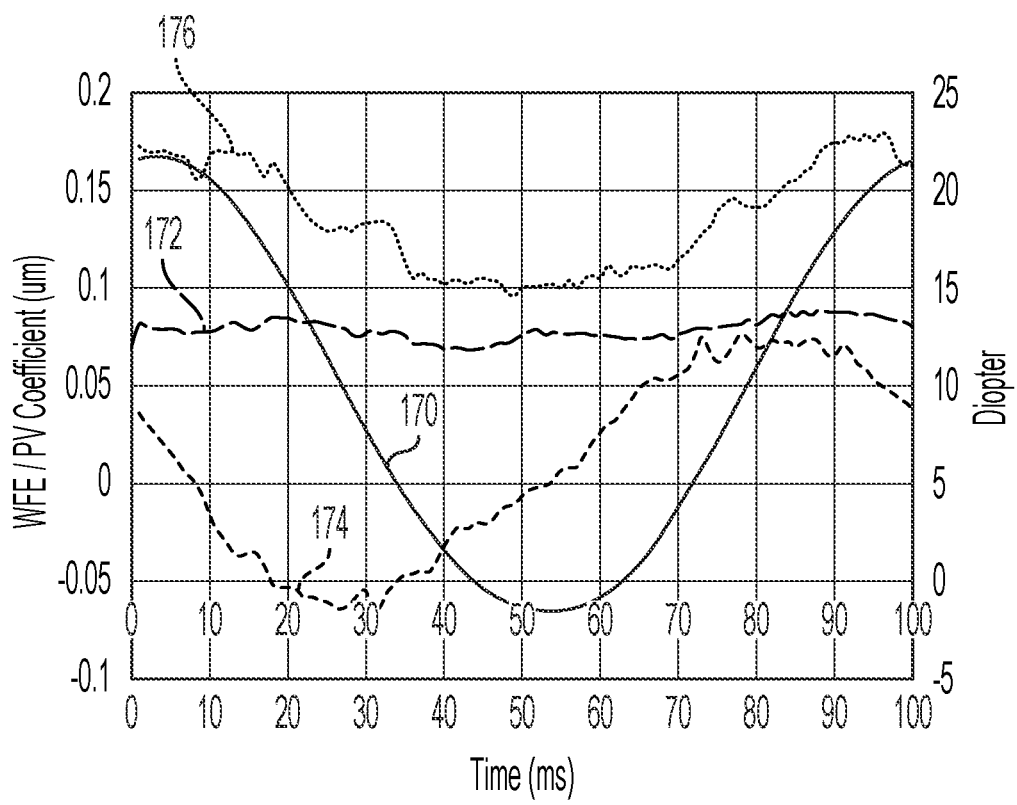
FIG. 5 is a plot representing the image quality of some embodiments of a liquid lens as the focus of the liquid lens sweeps through a range of focal lengths.

FIG. 5 is a plot representing the image quality of some embodiments of liquid lens 100 as the focus of the liquid lens sweeps through a range of focal lengths. The X-axis shows time in ms. The Y-axis on the left side of the plot shows RMS WFE or PV Zernike coefficients, both in μm. The Y-axis on the right side of the plot shows the focal length (e.g., lens power) of the liquid lens in diopter. The liquid lens used to generate the plot shown in FIG. 5 was the same as the liquid lens used to generate the plot shown in FIG. 4.

To generate the plot shown in FIG. 5, the focus of the liquid lens was adjusted in a periodic oscillation with a PV amplitude of 22 diopter and a frequency of 10 Hz, resulting in the changing focal length over time represented by a focus curve 170 having a peak at 21 diopter and a valley at −1 diopter. A WFE curve 172 shows the RMS WFE of the liquid lens, measured at 1 ms intervals during the focus adjustment (e.g., the focus oscillation). As shown in FIG. 5, the RMS WFE of the liquid lens remained at 90 nm or less throughout the one complete cycle of the periodic oscillation. A spherical aberration curve 174 shows the absolute value of the PV spherical Zernike coefficient (4) (e.g., the determined coefficient multiplied by −1), measured at 1 ms intervals during the focus adjustment (e.g., the focus oscillation). As shown in FIG. 5, the PV spherical Zernike coefficient remained below 50 nm throughout the one complete cycle of the periodic oscillation. A quadrafoil aberration curve 176 represents the PV vertical quadrafoil Zernike coefficient ($Z_4^4$), measured at 1 ms intervals during the focus adjustment (e.g., the focus oscillation). As shown in FIG. 5, the PV vertical quadrafoil Zernike coefficient remained below 180 nm throughout the one complete cycle of the periodic oscillation.

In some embodiments, upon adjusting the focus of liquid lens 100 in the periodic oscillation with the PV amplitude of 22 diopter and the frequency of 10 Hz, the RMS WFE of the liquid lens measured at 1 ms intervals remains at 100 nm or less or 90 nm or less throughout the one complete cycle of the periodic oscillation. Additionally, or alternatively, the PV spherical Zernike coefficient of liquid lens 100 remains below 50 nm throughout the one complete cycle of the periodic oscillation. Additionally, or alternatively, the PV vertical quadrafoil Zernike coefficient of liquid lens 100 remains below 180 nm throughout the one complete cycle of the periodic oscillation.

Comparing FIGS. 4 and 5, it can be seen that liquid lens 100 is capable of maintaining a low RMS WFE throughout the focus sweep, even at a significantly faster sweep. For example, liquid lens 100 can maintain the RMS WFE described herein throughout one complete cycle of a periodic oscillation having the PVR amplitude described herein (e.g., 20 diopter to 22 diopter) and a frequency of 2 Hz, 3 Hz, 4 Hz, 5 Hz, 6 Hz, 7 Hz, 8 Hz, 9 Hz, 10 Hz, or any ranges defined by any of the listed values.

Figure 6:
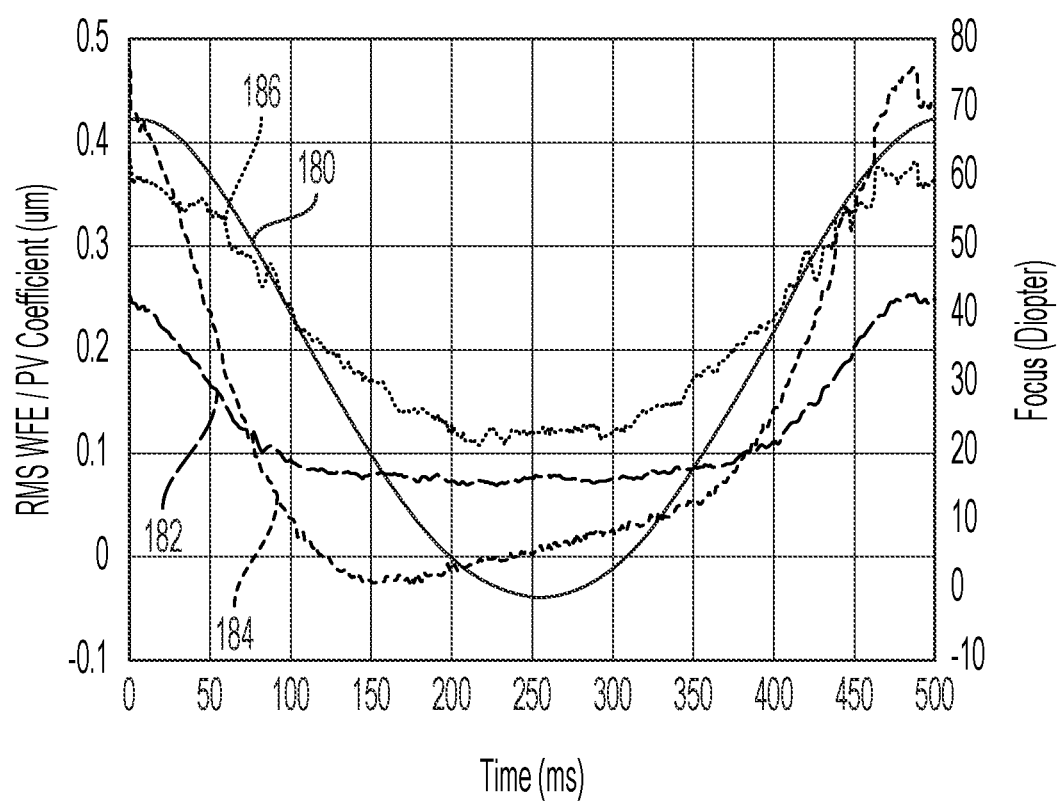
FIG. 6 is a plot representing the image quality of some embodiments of a liquid lens as the focus of the liquid lens sweeps through a range of focal lengths.

FIG. 6 is a plot representing the image quality of some embodiments of liquid lens 100 as the focus of the liquid lens sweeps through a range of focal lengths. The X-axis shows time in ms. The Y-axis on the left side of the plot shows RMS WFE or PV Zernike coefficients, both in μm. The Y-axis on the right side of the plot shows the focal length (e.g., lens power) of the liquid lens in diopter. The liquid lens used to generate the plot shown in FIG. 6 was the same as the liquid lens used to generate the plot shown in FIGS. 4 and 5.

To generate the plot shown in FIG. 6, the focus of the liquid lens was adjusted in a periodic oscillation with a PV amplitude of 69 diopter and a frequency of 2 Hz, resulting in the changing focal length over time represented by a focus curve 180 having a peak at 68 diopter and a valley at −1 diopter. A WFE curve 182 shows the RMS WFE of the liquid lens, measured at 1 ms intervals during the focus adjustment (e.g., the focus oscillation). As shown in FIG. 6, the RMS WFE of the liquid lens remained at 255 nm or less throughout the one complete cycle of the periodic oscillation. A spherical aberration curve 184 shows the absolute value of the PV spherical Zernike coefficient (4) (e.g., the determined coefficient multiplied by −1), measured at 1 ms intervals during the focus adjustment (e.g., the focus oscillation). As shown in FIG. 6, the PV spherical Zernike coefficient remained below 500 nm throughout the one complete cycle of the periodic oscillation. A quadrafoil aberration curve 186 represents the PV vertical quadrafoil Zernike coefficient ($Z_4^4$), measured at 1 ms intervals during the focus adjustment (e.g., the focus oscillation). As shown in FIG. 6, the PV vertical quadrafoil Zernike coefficient remained below 400 nm throughout the one complete cycle of the periodic oscillation.

In some embodiments, upon adjusting the focus of liquid lens 100 in the periodic oscillation with the PV amplitude of 69 diopter and the frequency of 2 Hz, the RMS WFE of the liquid lens measured at 1 ms intervals remains at 300 nm or less, 290 nm or less, 280 nm or less, 270 nm or less, 260 nm or less, or 255 nm or less throughout the one complete cycle of the periodic oscillation. Additionally, or alternatively, the PV spherical Zernike coefficient of liquid lens 100 remains below 500 nm throughout the one complete cycle of the periodic oscillation. Additionally, or alternatively, the PV vertical quadrafoil Zernike coefficient of liquid lens 100 remains below 400 nm throughout the one complete cycle of the periodic oscillation.

In some embodiments, upon adjusting the focus of liquid lens 100 in the periodic oscillation with the PV amplitude of 69 diopter and the frequency of 2 Hz, the RMS WFE of the liquid lens measured at 1 ms intervals remains at 250 nm or less, 200 nm or less, 150 nm or less, 140 nm or less, 130 nm or less, 120 nm or less, 110 nm or less, or 100 nm or less throughout a portion of the one complete cycle of the periodic oscillation in which the focus of the liquid lens is less than 40 diopter, less than 30 diopter, or less than 20 diopter. Thus, the image quality of the liquid lens can be suitable (e.g., for high speed video recording) through a useful portion of the focus adjustment (e.g., the continuous focus sweep).

The relatively low RMS WFE of liquid lens 100 during the focus adjustment illustrated in FIGS. 4-6 (e.g., the continuous focus sweep) can enable images to be captured while interface 110 is in transition (e.g., without waiting for the interface to settle or stop moving), which can enable recording video (e.g., high speed video) using the liquid lens as described herein.

Figure 7:
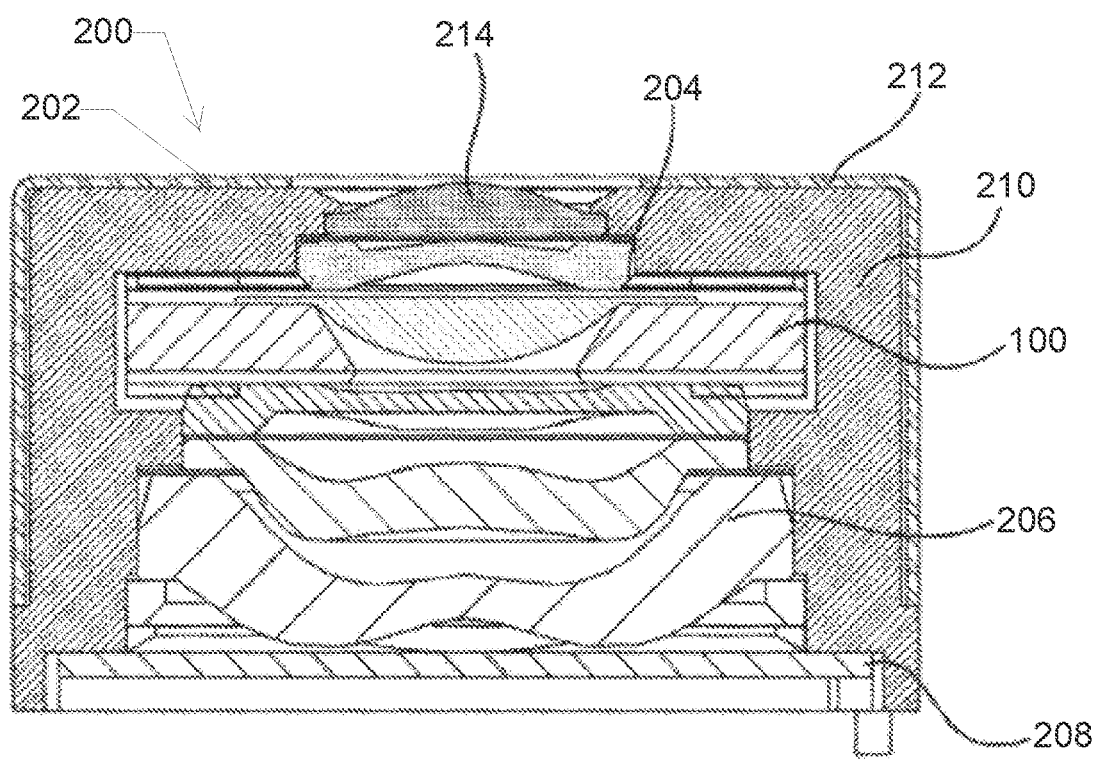
FIG. 7 is a schematic cross-sectional view of some embodiments of a video recording device.

FIG. 7 is a schematic cross-sectional view of some embodiments of a video recording device 200. For example, video recording device 200 can be configured as a camera module operable to record video (e.g., high speed video) as described herein. In some embodiments, video recording device 200 comprises a lens assembly 202. For example, lens assembly 202 comprises a first lens group 204, liquid lens 100, and a second lens group 206 aligned along an optical axis. Each of first lens group 204 and second lens group 206 can comprise, independently, one or a plurality of lenses (e.g., fixed lenses).

Although lens assembly 202 is described herein as comprising liquid lens 100, other embodiments are included in this disclosure. In some embodiments, the lens assembly comprises a variable focus lens, which can be a liquid lens (e.g., liquid lens 100), a hydrostatic fluid lens (e.g., comprising a fluid or polymeric material disposed within a flexible membrane with a curvature that is variable, for example, by injecting or withdrawing fluid and/or by applying an external force to the fluid lens), a liquid crystal lens, or another type of lens having a focal length that can be changed (e.g., without translating, tilting, or otherwise moving the lens assembly relative to the image sensor).

Although lens assembly 202 is described herein as comprising liquid lens 100 disposed between first lens group 204 and second lens group 206, other embodiments are included in this disclosure. In some other embodiments, a lens assembly comprises a single lens or a single lens group disposed on either side (e.g., the object side or the image side) of liquid lens 100 along the optical axis.

In some embodiments, video recording device 200 comprises an image sensor 208. For example, lens assembly 202 is positioned to focus an image on image sensor 208. Image sensor 208 can comprise a semiconductor charge-coupled device (CCD), a complementary metal-oxide_semiconductor (CMOS), an N-type metal-oxide-semiconductor (NMOS), another image sensing device, or a combination thereof. Image sensor 208 can detect image light focused on the image sensor by lens assembly 202 to capture the image represented by the image light. In some embodiments, image sensor 208 can repeatedly capture images represented by the image light to record a video (e.g., a high speed video) as described herein.

In some embodiments, video recording device 200 comprises a housing 210. For example, lens assembly 202 and/or image sensor 208 are mounted in housing 210 as shown in FIG. 7. Such a configuration can help to maintain proper alignment between lens assembly 202 and image sensor 208. In some embodiments, video recording device 200 comprises a cover 212. For example, cover 212 is positioned on housing 210. Cover 212 can help to protect and/or shield lens assembly 202, image sensor 208, and/or housing 210. In some embodiments, video recording device 200 comprises a lens cover 214 disposed adjacent lens assembly 202 (e.g., at the object side end of the lens assembly). Lens cover 214 can help to protect lens assembly 202 (e.g., first lens group 204) from scratches or other damage.

In some embodiments, a field of view (FOV) of the variable focus lens (e.g., liquid lens 100) remains substantially constant during the focus adjustment (e.g., the focus sweep described in reference to FIGS. 4-6). For example, the FOV of liquid lens 100 remains substantially constant throughout the one complete cycle of the periodic oscillation. Such constant FOV can be enabled by the lack of physical movement (e.g., translation in a direction parallel to the optical axis) of liquid lens 100 and/or optical system 202 relative to image sensor 208. Additionally, or alternatively, such constant FOV can enable varying the focus of liquid lens 100 without compensating for variations at the edges of the resulting image incident on image sensor 208 (e.g., variations caused by a changing FOV with changing focus). The processing power that can be saved by not compensating for such variations can help to enable the high speed video recording described herein.

Figure 8:
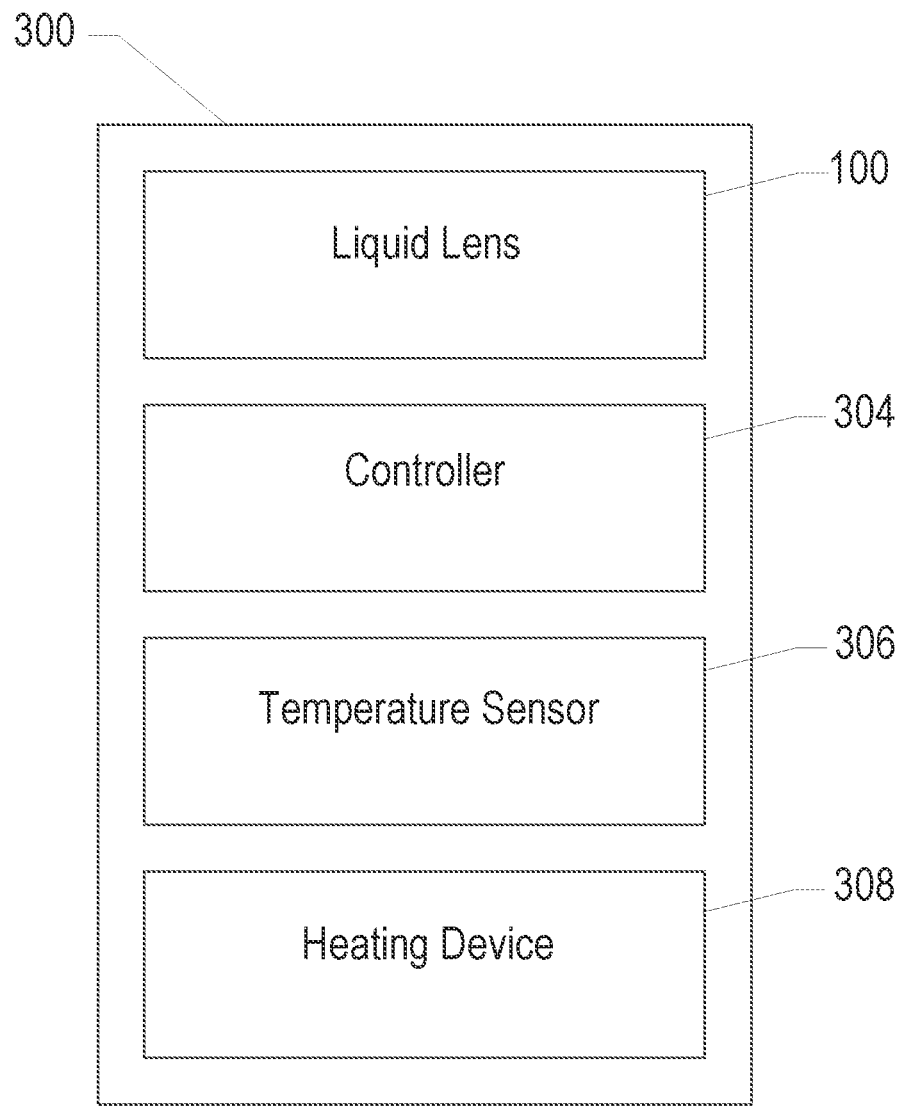
FIG. 8 is a block diagram illustrating some embodiments of a video recording system.

FIG. 8 is a block diagram illustrating some embodiments of a video recording system 300. In some embodiments, video recording system 300 comprises a variable focus lens, such as for example, liquid lens 100. In some embodiments, video recording system 300 comprises a controller 304. Controller 304 can be configured to supply a common voltage to common electrode 124 of liquid lens 100 and a driving voltage to driving electrode 126 of the liquid lens. A shape of interface 110 of liquid lens 100 and/or a position of the interface of the liquid lens can be controlled by the voltage differential between the common voltage and the driving voltage. In some embodiments, the common voltage and/or the driving voltage comprises an oscillating voltage signal (e.g., a square wave, a sine wave, a triangle wave, a sawtooth wave, or another oscillating voltage signal). In some of such embodiments, the voltage differential between the common voltage and the driving voltage comprises a root mean square (RMS) voltage differential. Additionally, or alternatively, the voltage differential between the common voltage and the driving voltage is manipulated using pulse width modulation (e.g., by manipulating a duty cycle of the differential voltage signal), pulse amplitude modulation (e.g., by manipulating the amplitude of the differential voltage signal), another suitable control method, or a combination thereof.

In various embodiments, controller 304 can comprise one or more of a general processor, a digital signal processor, an application specific integrated circuit, a field programmable gate array, an analog circuit, a digital circuit, a server processor, combinations thereof, or other now known or later developed processor. Controller 304 can implement one or more of various processing strategies, such as multi-processing, multi-tasking, parallel processing, remote processing, centralized processing, or the like. Controller 304 can be responsive to or operable to execute instructions stored as part of software, hardware, integrated circuits, firmware, microcode, or the like.

In some embodiments, video recording system 300 comprises a temperature sensor 306, which can be integrated into liquid lens 100, video recording device 200, or another component of the video recording system. Temperature sensor 306 can be configured to detect a temperature within video recording device 200 (e.g., within liquid lens 100) and generate a temperature signal indicative of the detected temperature. In some embodiments, the voltage differential between the common voltage and the driving voltage is based at least in part on a temperature signal generated by the temperature sensor, which can enable compensation for changing electrical properties and/or physical properties of the liquid lens with changes in temperature. Such compensation can help to enable the improved speed and image quality of the liquid lens described herein.

In some embodiments, video recording system 300 comprises a heating device 308, which can be integrated into liquid lens 100, video recording device 200, or another component of the video recording system. Heating device 308 can be configured to introduce heat into video recording device 200 (e.g., into liquid lens 100) to increase the temperature of the video recording device, or a portion thereof. Such heating can help to enable the improved speed and image quality of the liquid lens described herein.

Figure 9:
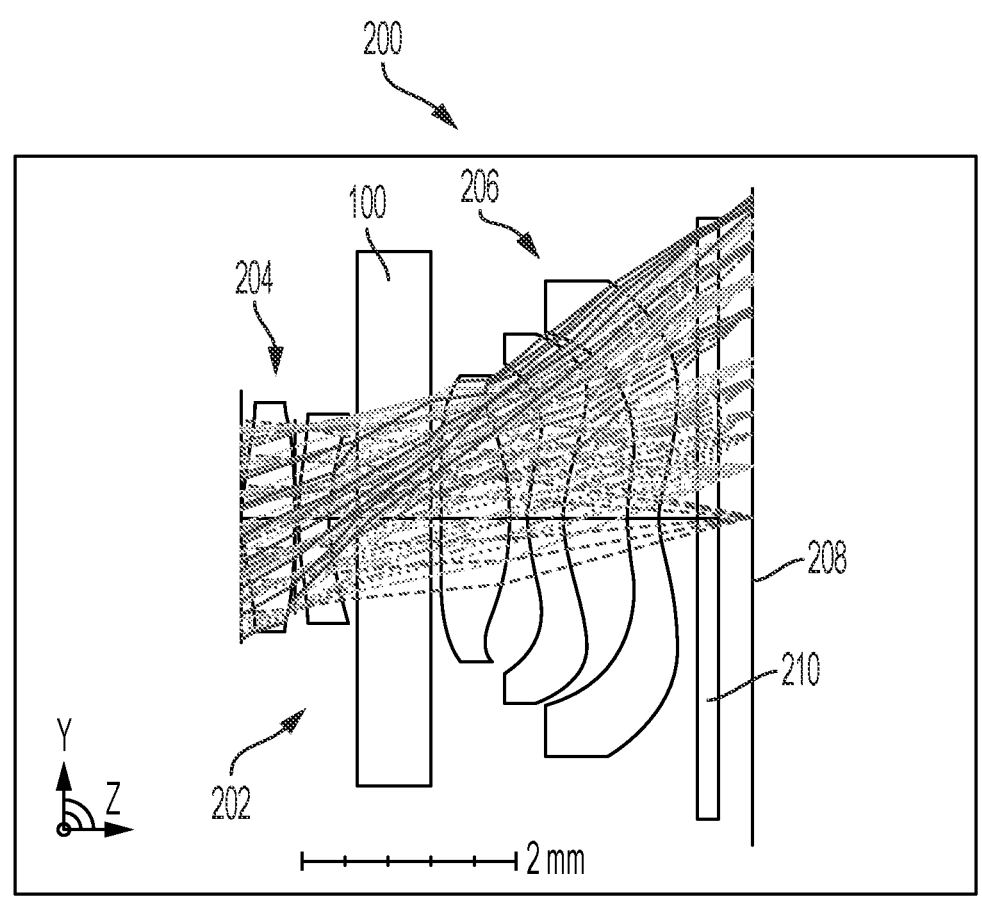
FIG. 9 is a schematic ray diagram of some embodiments of the video recording device shown in FIG. 7.

FIG. 9 is a schematic ray diagram of some embodiments of video recording device 200. In some embodiments, video recording device 200 comprises lens assembly 202 comprising first lens group 204, liquid lens 100, and second lens group 206 aligned along the optical axis. In the embodiments shown in FIG. 9, first lens group 204 comprises two fixed lenses, and second lens group 206 comprises three fixed lenses. In other embodiments, the first and second lens group can comprise more or fewer lenses. In some embodiments, video recording device 200 comprises image sensor 208 and an infrared (IR) cut filter 210, and lens assembly 202 is positioned to focus an image through the IR cut filter onto the image sensor. In the embodiments shown in FIG. 9, image sensor 208 comprises a 1/3.2" optical format sensor (e.g., a sensor with a diagonal length of 5.68 mm, a width of 4.54 mm, a height of 3.42 mm, an area of 15.5 mm², and a pixel size of about 1 μm).

Figure 10A:
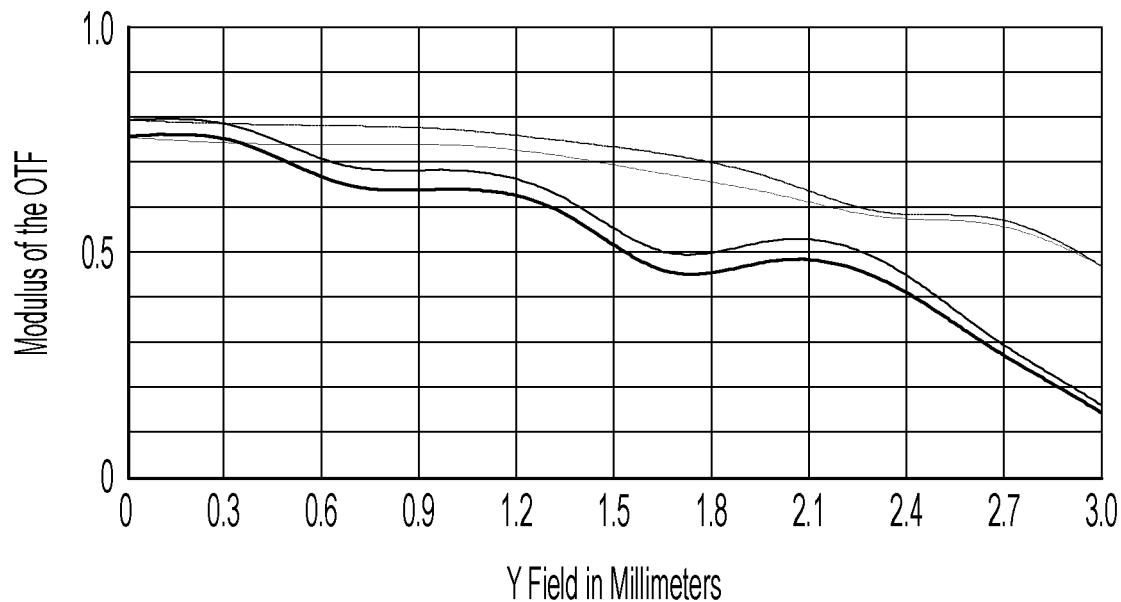
FIGS. 10A-10N are plots representing the modelled spatial frequency response (SFR) of some embodiments of the video recording device shown in FIG. 9 across the field as the focus of the liquid lens sweeps through the range of focal lengths as shown in FIG. 6.
Figure 10B:
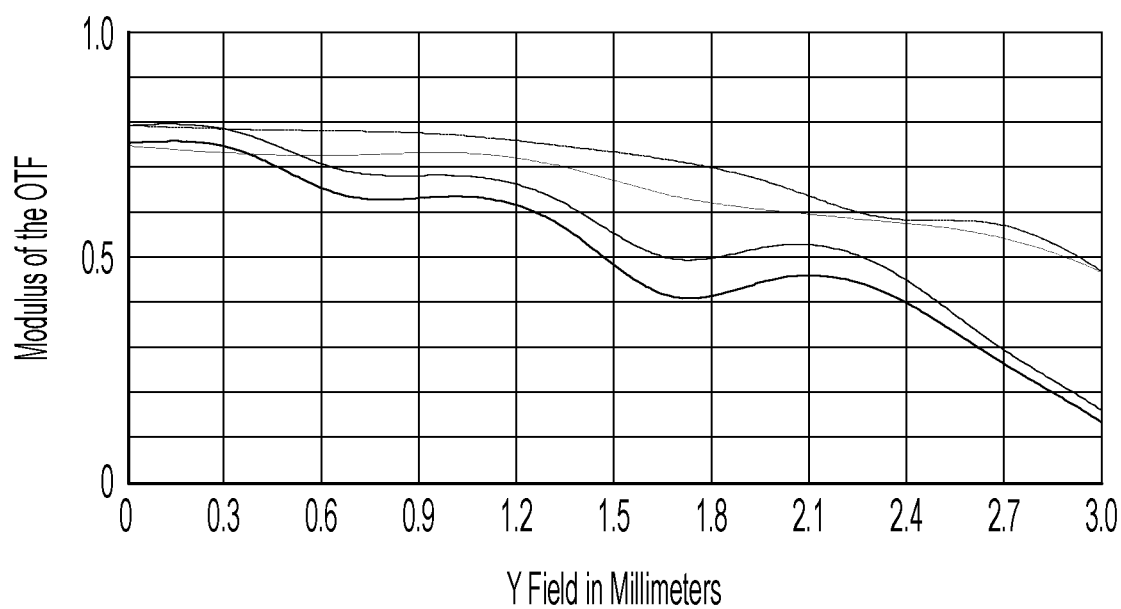
Figure 10C:
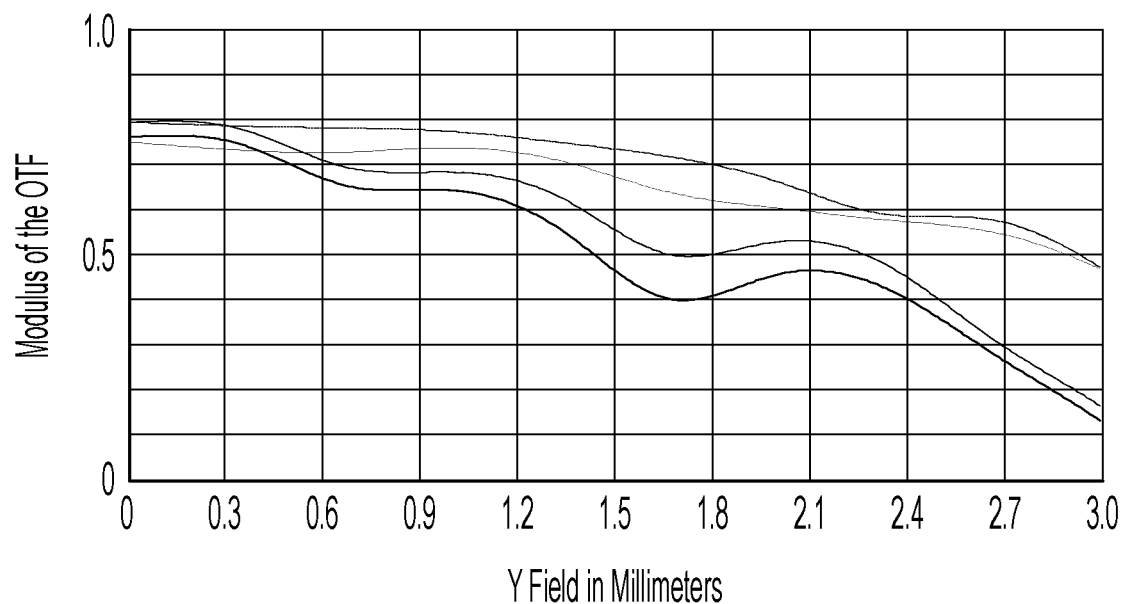
Figure 10D:
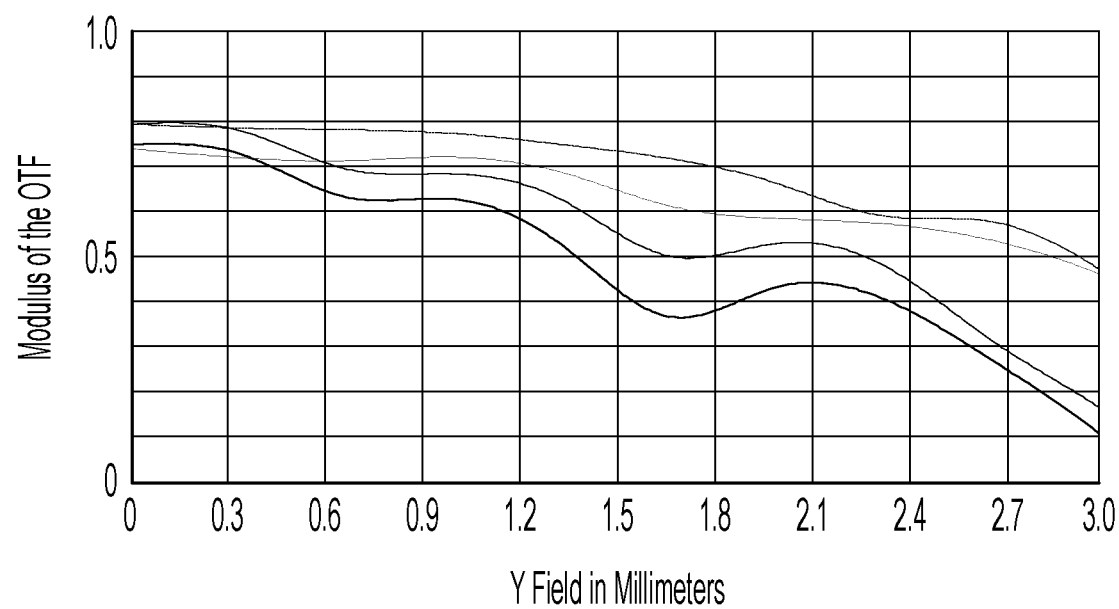
Figure 10E:
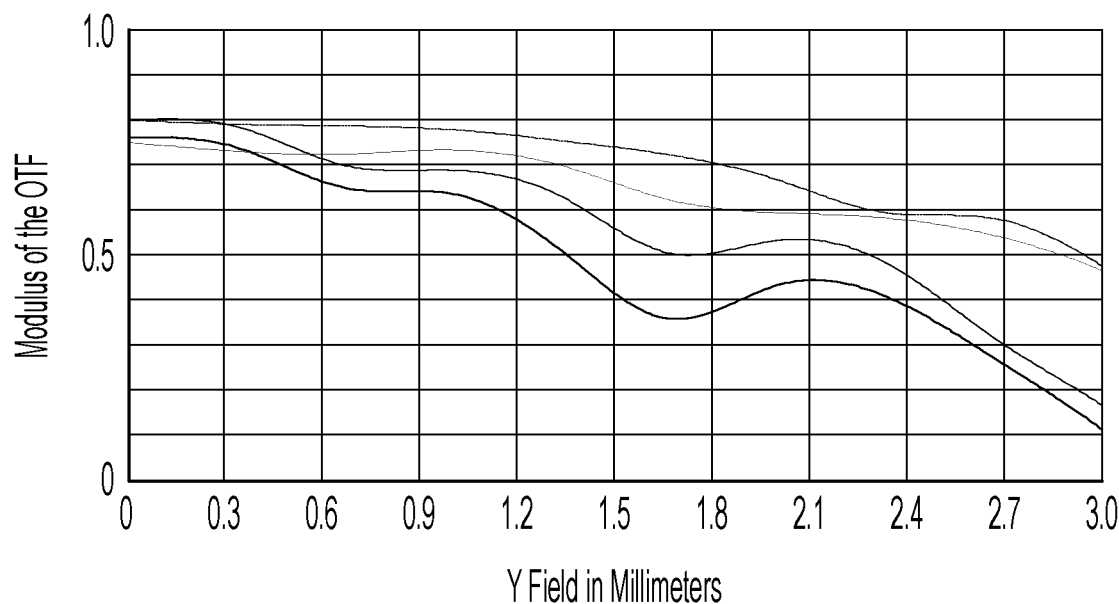
Figure 10F:
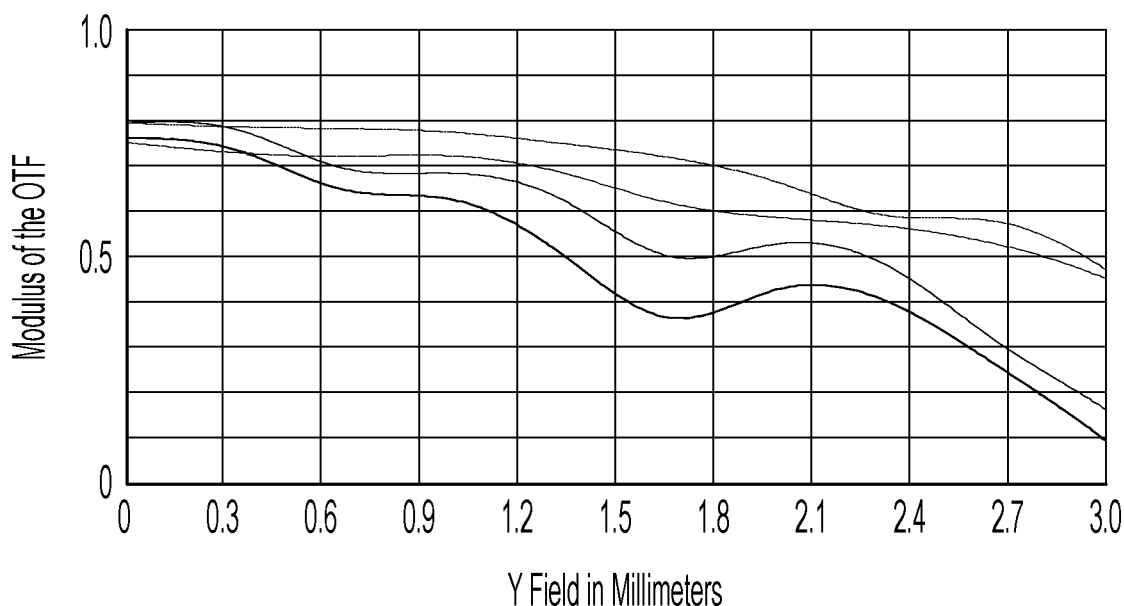
Figure 10G:
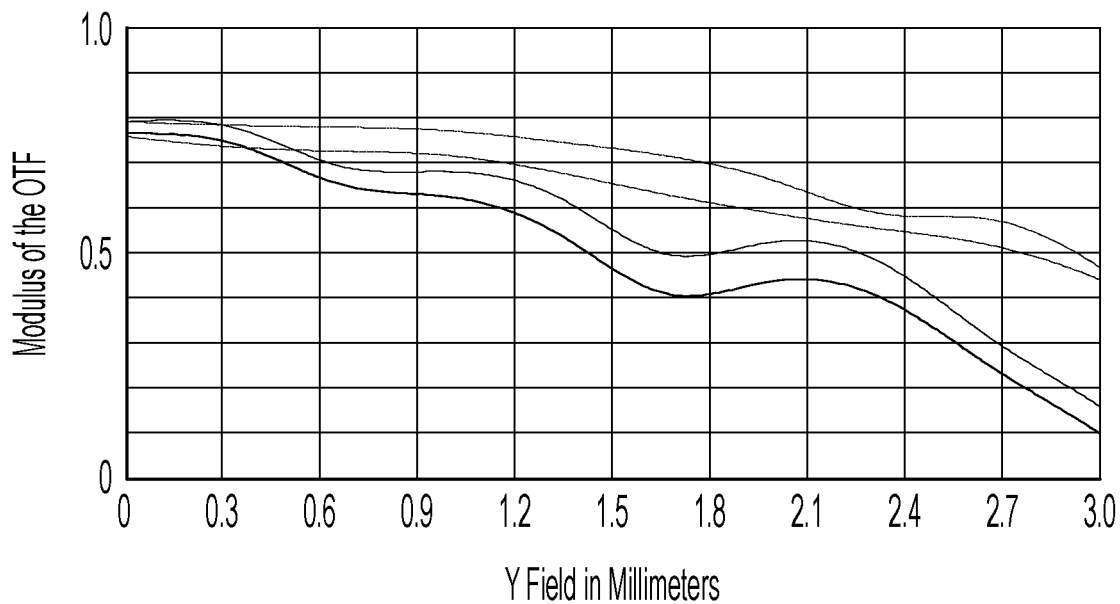
Figure 10H:
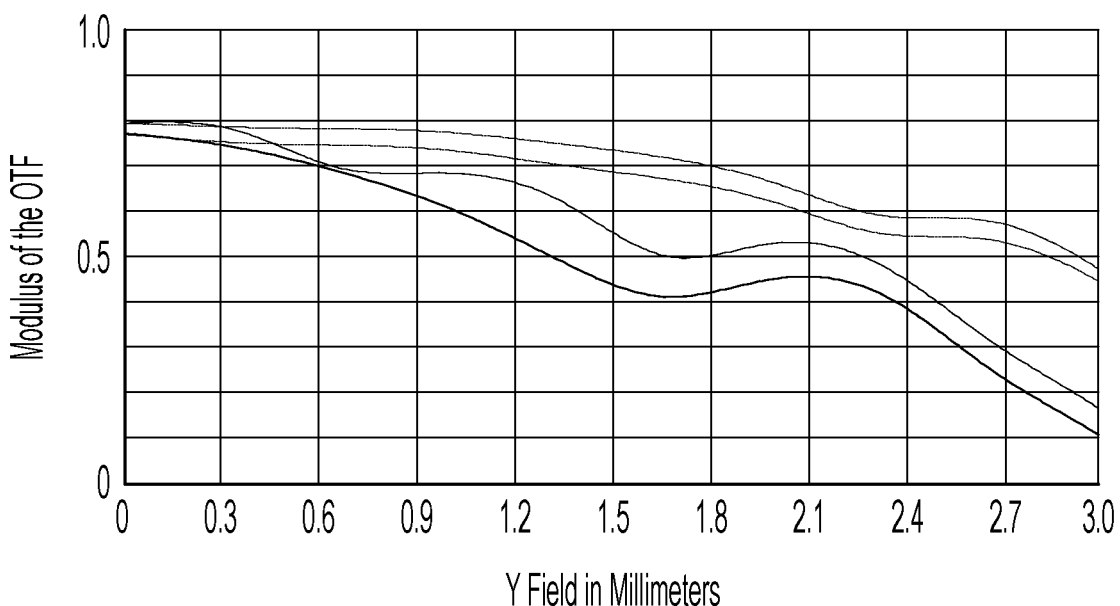
Figure 10I:
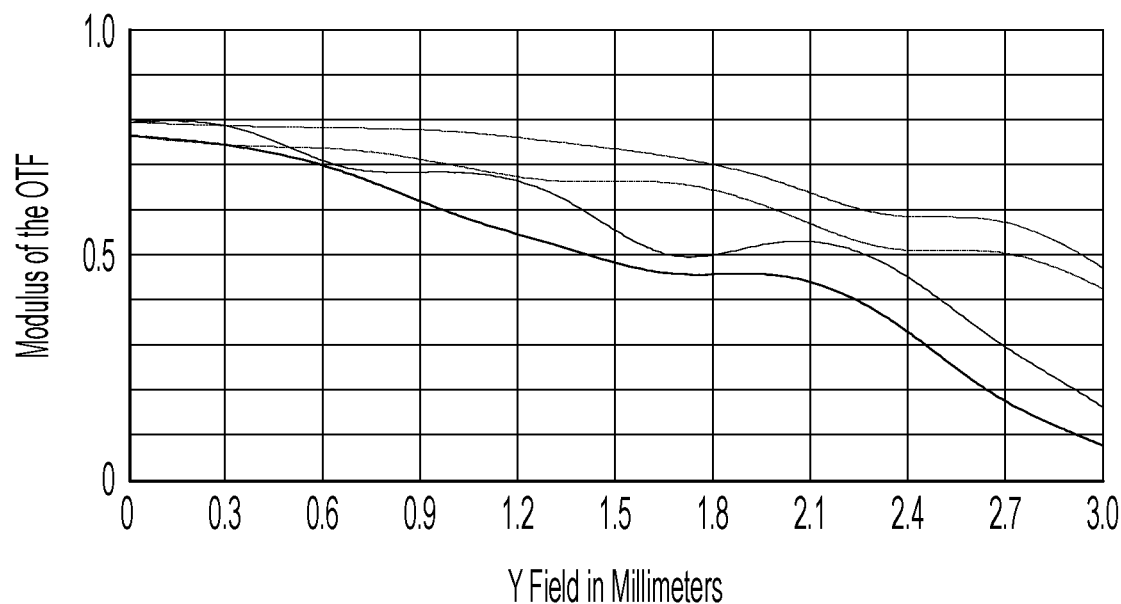
Figure 10J:
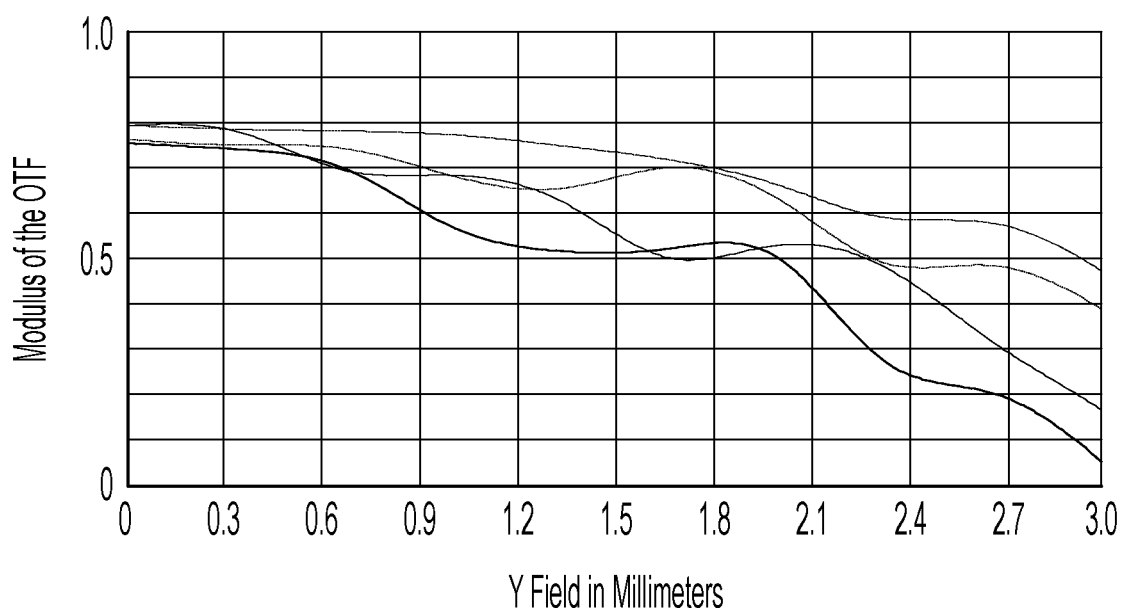
Figure 10K:
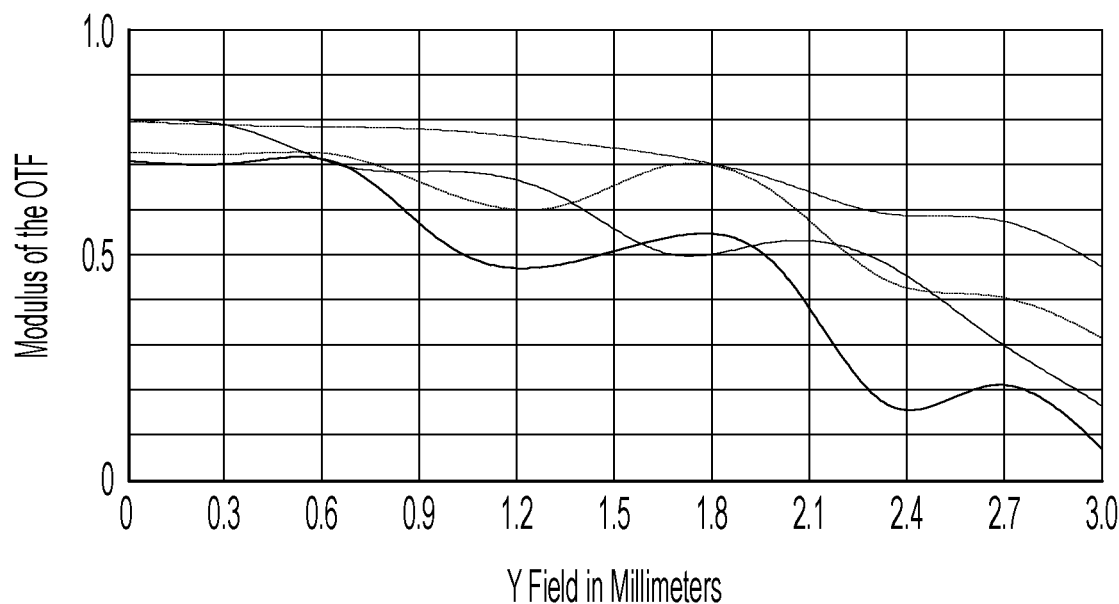
Figure 10L:
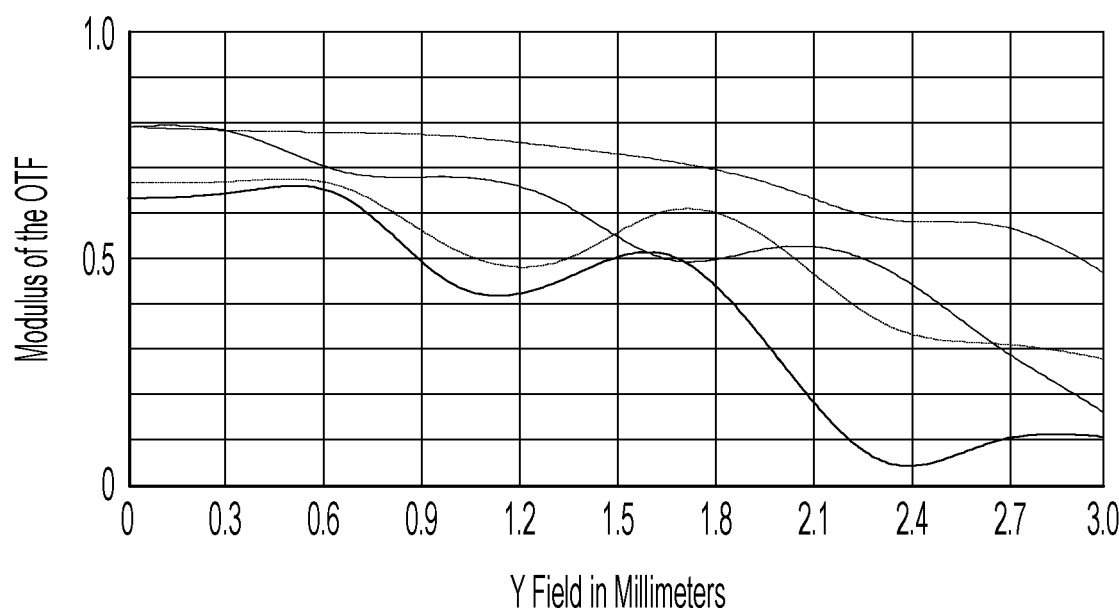
Figure 10M:
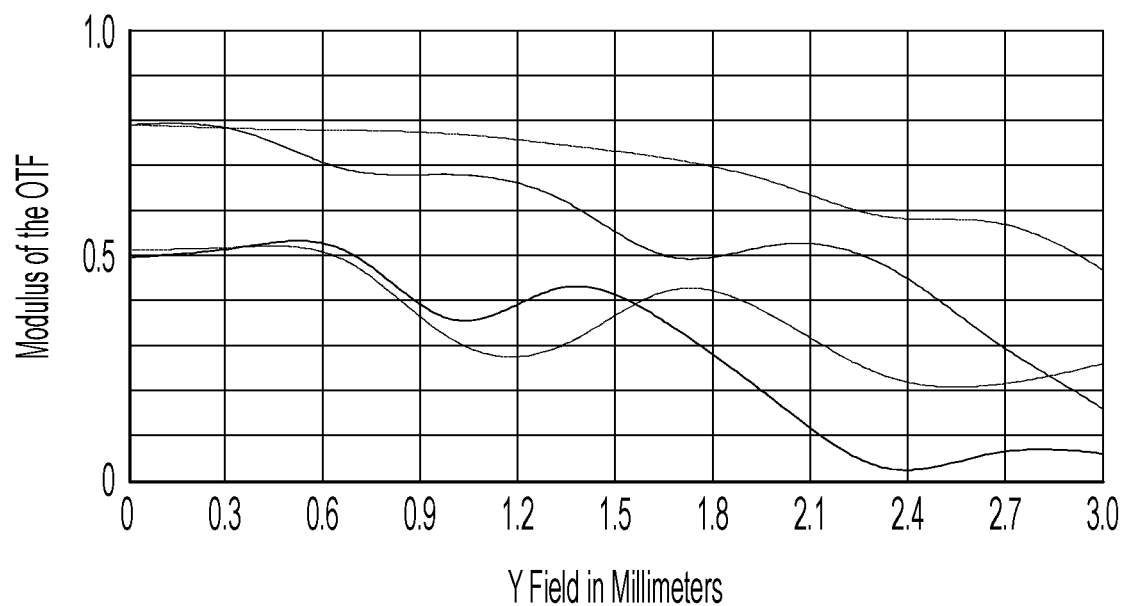
Figure 10N:
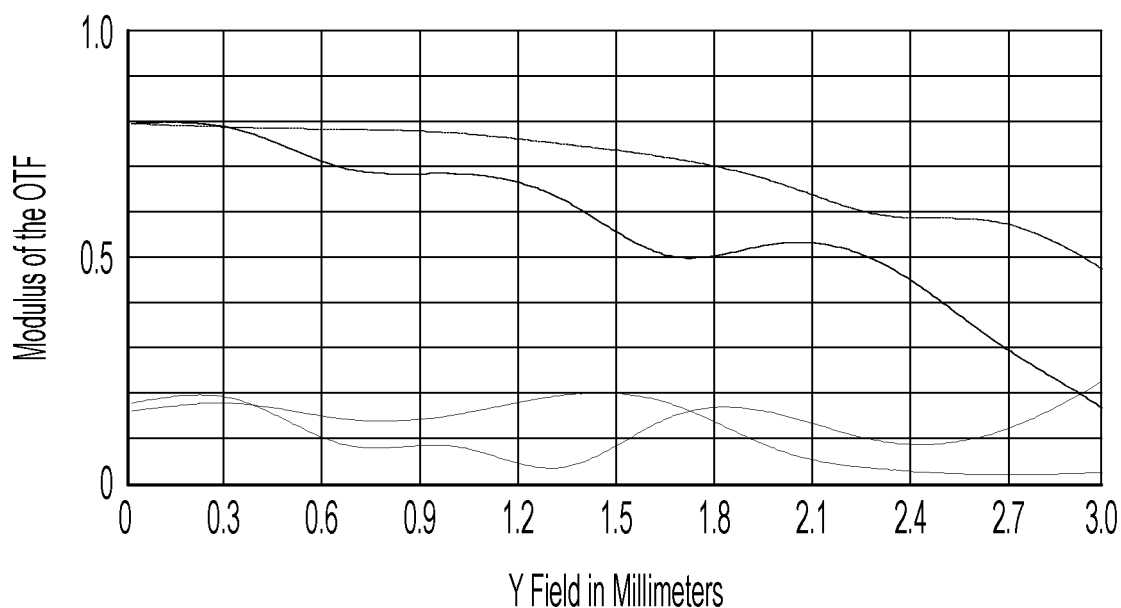

FIGS. 10A-10N are plots representing the modelled SFR of video recording device 200 shown in FIG. 9 across the field as the focus of liquid lens 100 sweeps through the range of focal lengths as shown in FIG. 6. To generate the plots shown in FIGS. 10A-10N, the SFR of the video recording device was modelled at a frequency of 110 line pairs per millimeter (lp/mm), which is equivalent to a ¼ Nyquist frequency of the image sensor, which can be determined based on the pixel pitch of the image sensor. In the plots shown in FIGS. 10A-10N, the X-axis shows the Y field (e.g., the horizontal field) in mm, and the Y-axis shows the SFR. It should be noted that the Y field numbers shown in FIGS. 10A-10N are half-field numbers representing half of the image sensor (e.g., with zero on the Y-axis representing the horizontal center of the image sensor). Thus, the full field numbers can be determined by multiplying the reported half-field numbers by two, and the SFR data for the other half of the image sensor would be a mirror image of the data shown in the plots. The Y field in mm represents the position (e.g., the horizontal position) on the image sensor. The Y field in mm can be converted to radians (or degrees) using the following equation (1):

$$Y = f \tan \theta \quad (1),$$

where Y is the Y field in mm, f is the focal length of the lens system of the video recording device in mm, and θ is the Y field in radians (e.g., the field of view). Additionally, or alternatively, the Y field in mm can be expressed as a percentage of the width of the image sensor.

In FIGS. 10A-10N, The solid lines (lower pair of lines) represent the SFR, and the dotted lines (upper pair of lines) represent the ideal SFR. Thus, the distance between the SFR and the ideal SFR over the field can give an indication of the optical quality of the images captured by the image sensor as the liquid lens sweeps through the range of focal lengths. For each pair of lines, the upper line corresponds to a sagittal SFR, and the lower line corresponds to a tangential SFR.

FIG. 10A represents the SFR of video recording device 200 with liquid lens 100 at a focus of 0 diopter. FIG. 10B represents the SFR of video recording device with liquid lens 100 at a focus of 5 diopter. FIG. 10C represents the SFR of video recording device with liquid lens 100 at a focus of 10 diopter. FIG. 10D represents the SFR of video recording device with liquid lens 100 at a focus of 15 diopter. FIG. 10E represents the SFR of video recording device with liquid lens 100 at a focus of 20 diopter. FIG. 10F represents the SFR of video recording device with liquid lens 100 at a focus of 25 diopter. FIG. 10G represents the SFR of video recording device with liquid lens 100 at a focus of 30 diopter. FIG. 10H represents the SFR of video recording device with liquid lens 100 at a focus of 35 diopter. FIG. 10I represents the SFR of video recording device with liquid lens 100 at a focus of 40 diopter. FIG. 10J represents the SFR of video recording device with liquid lens 100 at a focus of 45 diopter. FIG. 10K represents the SFR of video recording device with liquid lens 100 at a focus of 50 diopter. FIG. 10L represents the SFR of video recording device with liquid lens 100 at a focus of 55 diopter. FIG. 10M represents the SFR of video recording device with liquid lens 100 at a focus of 60 diopter. FIG. 10N represents the SFR of video recording device with liquid lens 100 at a focus of 68 diopter.

As shown in FIGS. 10A-10N, the SFR of video recording device 200 decreases with increasing field and with increasing focal length as the focus of liquid lens 100 sweeps through the range of focal lengths. However, the improved image quality of liquid lens 100 during transition of the focus as described herein can enable video recording device 200 to have a suitable image quality (e.g., as reflected by the SFR) up to a maximum field (e.g., a maximum field of interest for an intended application) and/or over a focus range (e.g., a focus range of interest for an intended application). In some embodiments, video recording device 200 maintains a SFR of at least 35%, at least 40%, at least 50%, at least 60%, or at least 70% up to a maximum field over a focus range. For example, the maximum field can be 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, or 4.0 mm. Additionally, or alternatively, the maximum field can be 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, or 75 degrees. In some embodiments, the maximum field can represent the maximum half field as described herein. Thus, the maximum full field can be twice the listed values (e.g., the listed values in mm or degrees). Additionally, or alternatively, the focus range can be 0 diopter to 5 diopter, 10 diopter, 15 diopter, 20 diopter, 25 diopter, 30 diopter, 35 diopter, 40 diopter, 45 diopter, 50 diopter, 55 diopter, or any ranges bounded by any combination of the listed values. In some embodiments, the SFR can be measured as described in ISO 12233:2017, Photography—Electronic still picture imaging—Resolution and spatial frequency responses. Additionally, or alternatively, the SFR can be measured at a ¼ Nyquist frequency.

Figure 11:
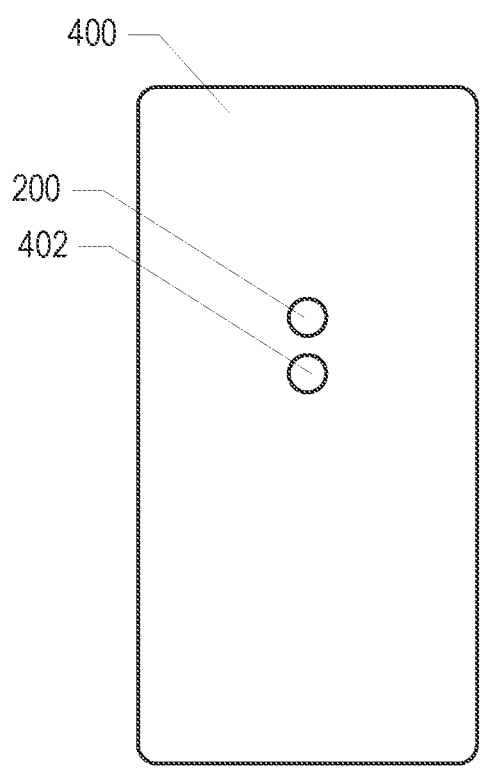
FIG. 11 is a schematic rear view of some embodiments of a smartphone comprising a video recording device.

In some embodiments, an electronic device comprises video recording device 200. For example, the electronic device can be a smartphone, a tablet computer, a laptop computer, a wearable device, an augmented reality (AR) device, a virtual reality (VR) device, a digital camera, a video chat device, an action camera device, or another suitable electronic device. FIG. 11 is a schematic rear view of some embodiments of a smartphone 400 comprising video recording device 200. In some embodiments, smartphone 400 comprises a camera module 402. Video recording device 200 and camera module 402 can be configured to perform different functions. For example, smartphone 400 can be operable to record a video using video recording device 200 and capture a still photograph using camera module 402. Additionally, or alternatively, video recording device 200 can be a dedicated video recording device that is distinct from camera module 402. Such a design can enable video recording device 200 to be configured for improved video recording (e.g., high speed video recording) and camera module 402 to be configured for improved still photography.

Although video recording device 200 is described as being incorporated into an electronic device, other embodiments are included in this disclosure. For example, in other embodiments, a vehicle (e.g., an automobile, a truck, a motorcycle, an aircraft, a bus, a train, a watercraft, a drone, or another type of conveyance for people or objects) comprises video recording device 200.

Although video recording device 200 is described herein as recording video, other embodiments are included in this disclosure. In some embodiments, the video recording device is capable of recording still images or both video and still images. For example, the video recording device can record still images and/or can record video by sequentially capturing a plurality of still images.

Figure 12:
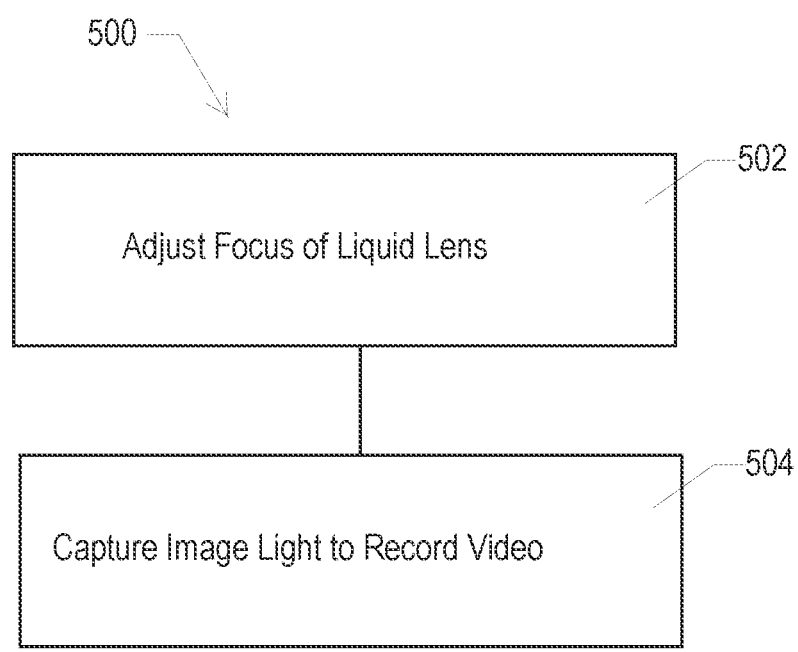
FIG. 12 is a flow chart illustrating some embodiments of a method for recording a video.

FIG. 12 is a flow chart illustrating some embodiments of a method 500 for recording a video. In some embodiments, method 500 comprises adjusting a focus of liquid lens 100 from a first focal length to a second focal length at step 502. In some embodiments, method 500 comprises capturing image light passing through liquid lens 100 and incident on image sensor 208 during the adjusting the focus of the liquid lens at an image capture rate to record the video at step 504. For example, the image capture rate is at least 240 frames per second (fps), at least 480 fps, or at least 960 fps. The response time and/or the relatively low RMS WFE of liquid lens 100 described herein can help to enable such a high image capture rate (e.g., the high speed video recording) while maintaining the image quality of the resulting video. For example, video recording device 200 comprising liquid lens 100 and image sensor 208 comprises a SFR as described herein, which can enable the resulting video quality.

In some embodiments, the adjusting the focus of liquid lens 100 comprises adjusting the focus of the liquid lens at a focus adjustment rate. Additionally, or alternatively, a ratio of the focus adjustment rate to the image capture rate is 0.1 diopter/frame, 0.2 diopter/frame, 0.3 diopter/frame, 0.4 diopter/frame, 0.5 diopter/frame, or any ranges bounded by any of the listed values. For example, the ratio of the focus adjustment rate to the image capture rate is 0.1 diopter/frame to 0.5 diopter/frame. Maintaining the ratio of the focus adjustment rate to the image capture rate at or below 0.5 diopter/frame can help to avoid blurring of the video (e.g., by too large a change in focus over a single frame of the video).

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The instructions can reside in RAM memory, flash memory, ROM memory, EPROM memory, EEPROM memory, registers, hard disk, a removable disk, a CD-ROM, or any other form of non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The processor(s) and/or controller(s) described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface (GUI), among other things.

The processor(s) and/or controller(s) described herein may implement the techniques described herein using customized hard-wired logic, one or more ASICs or FPGAs, firmware and/or program logic which causes microprocessors and/or controllers to be a special-purpose machine. In some embodiments, parts of the techniques disclosed herein are performed by a processor (e.g., a microprocessor) and/or other controller elements in response to executing one or more sequences of instructions contained in a memory. Such instructions may be read into the memory from another storage medium, such as a storage device. Execution of the sequences of instructions contained in the memory may cause the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. In some embodiments, a processor device can include electrical circuitry configured to process computer-executable instructions. Additionally, or alternatively, a processor device can include an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A liquid lens comprising:
   a cavity;
   a first liquid disposed within the cavity; and
   a second liquid disposed within the cavity;
   wherein a focus of the liquid lens is adjustable by adjusting a shape of a variable interface defined by the first liquid and the second liquid; and
   wherein upon adjusting the focus of the liquid lens in a periodic oscillation with a peak-to-valley amplitude of 20 diopter and a frequency of 2 Hz, a root mean square (RMS) wavefront error (WFE) of the liquid lens measured at 1 ms intervals remains at 100 nm or less throughout one complete cycle of the periodic oscillation.

2. The liquid lens of claim 1, wherein the periodic oscillation comprises a peak at 22 diopter and a trough at 2 diopter.

3. The liquid lens of claim 1, wherein the periodic oscillation comprises a peak at 15 diopter and a trough at −5 diopter.

4. The liquid lens of claim 1, wherein a field of view (FOV) of the liquid lens remains substantially constant throughout the one complete cycle of the periodic oscillation.

5. The liquid lens of claim 1, wherein the first liquid and the second liquid are in contact with each other at the interface.

6. The liquid lens of claim 1, wherein the first liquid and the second liquid are separated from each other by a membrane at the interface.

7. The liquid lens of claim 1, wherein the RMS WFE of the liquid lens measured at 1 ms intervals remains at 80 nm or less throughout the one complete cycle of the periodic oscillation.

8. The liquid lens of claim 1, wherein the RMS WFE of the liquid lens measured at 1 ms intervals remains at 70 nm or less throughout the one complete cycle of the periodic oscillation.

9. The liquid lens of claim 1, comprising:
   a common electrode in electrical communication with the first liquid; and
   a driving electrode insulated from each of the first liquid and the second liquid;
   wherein the focus of the liquid lens is adjustable by adjusting the voltage between the common electrode and the driving electrode to adjust the shape of the variable interface defined by the first liquid and the second liquid.

10. The liquid lens of claim 9, wherein the driving electrode is disposed on a sidewall of the cavity.

11. The liquid lens of claim 10, wherein the driving electrode comprises a single driving electrode substantially circumscribing the sidewall of the cavity.

12. The liquid lens of claim 10, wherein the driving electrode comprises a plurality of driving electrodes distributed substantially uniformly about the sidewall of the cavity.

* * * * *